(12) United States Patent
Kon et al.

(10) Patent No.: US 6,421,597 B2
(45) Date of Patent: Jul. 16, 2002

(54) CONTROL SYSTEM FOR AUTOMATIC VEHICLE TRANSMISSIONS

(75) Inventors: Takanori Kon; Yasushi Inagawa; Yoshiharu Saito; Masamitsu Fukuchi; Shinya Majikina, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 35 days.

(21) Appl. No.: 09/731,767

(22) Filed: Dec. 8, 2000

(30) Foreign Application Priority Data

Dec. 9, 1999 (JP) .......................... 11-350890
Dec. 9, 1999 (JP) .......................... 11-350891

(51) Int. Cl.$^7$ ................................. G06G 7/70
(52) U.S. Cl. ........................ 701/51; 477/34; 477/110
(58) Field of Search .......................... 701/51, 54, 55, 701/61, 66; 477/34, 38, 45, 109, 110

(56) References Cited

U.S. PATENT DOCUMENTS 5,938,712 A * 8/1999 Ibamoto et al. ............... 701/54

FOREIGN PATENT DOCUMENTS

| JP | 6-207660 | 7/1994 |
| JP | 6-341525 | 12/1994 |
| JP | 7-151222 | 6/1995 |

* cited by examiner

Primary Examiner—William A. Cuchlinski, Jr.
Assistant Examiner—Arthur D. Donnelly
(74) Attorney, Agent, or Firm—Arent Fox Kintner Plotkin & Kahn, PLLC

(57) ABSTRACT

A system for controlling an automatic transmission of a vehicle, wherein the hydraulic pressure to be supplied to the frictional engaging element such as a hydraulic clutch is determined, taking the performance of tracking or follow-up of the hydraulic pressure into account so as to enhance the control toughness against the engine speed change, thereby decreasing the shift shock effectively so as to improve the feeling of the vehicle occupant, while ensuring to prevent the engine from revving over or excessively. Further, the friction coefficient of the hydraulic clutch is calculated additionally taking parameters including the rotational difference thereof into account to determine the pressure to be supplied to the frictional engaging element, thereby further decreasing the shift shock effectively.

28 Claims, 36 Drawing Sheets

QATON, QUTA1, QUIAL REACHED AT TORQUE-PHASE

TORQUE-PHASE DESIRED TIME TMUTAG

QDB2A

TMDB2A
TMDB2B
TMDB2C

IMPOSSIBLE TO GENERATE QATON HEIGHT BY THIS SLOPE (RETRIEVED BY QATON)

QDB2A

CORRECT SLOPE AND EXTEND TIME

QATON HEIGHT(QUIA1) REMAINS SAME

TMDB2A
TMDB2B
TMDB2C

BASIC EQUATION OF GENERATED CLUTCH TORQUE Tcl
TQON(TQOF)=2·n·μ·Rm·(QATON·Apis+Fctf−Frtn)

SOLVING ON CLUTCH PRESSURE Pcll $$QATON(QATOF) = \left( \frac{TQON}{2 \cdot n \cdot \mu \cdot Rm} - Fctf + Frtn \right) / Apis$$

CONTROL SYSTEM FOR AUTOMATIC VEHICLE TRANSMISSIONS

BACKGROUND OF THE INVENTION

1. Field of the Invention

This invention relates to a control system for an automatic vehicle transmission.

2. Description of the Related Art

As a typical prior-art control system for automatic vehicle transmissions, Japanese Laid-Open Patent Application No. Hei 6 (1994)-341525 teaches detecting over-revving of the engine and tie-up of the frictional engaging element such as a hydraulic clutch and when it is detected that the engine revs over or excessively, changing the characteristics of control to raise the pressure of the clutch to be engaged, to make the slope steep in the wave-form of supplied pressure or to quicken the timing to raise the pressure, thereby suppressing the shift shock due to over-revving of the engine or clutch tie-up.

Since, however, the performance of tracking or follow-up of hydraulic pressure is not taken into account in this prior art, the engine may rev over when the engine torque is increased. In other words, the control toughness against the engine speed is not satisfactory in the prior art.

Aside from the above, when determining the pressure to be supplied to the frictional engaging element such as the clutch, as taught by Japanese Laid-Open Patent Application No. Hei 7 (1995)-151222, in view of the fact that the friction coefficient $\mu$ of the clutch varies depending on the temperature of the pressurized oil (ATF), i.e, the viscosity of oil, the pressure to be supplied is corrected by the friction coefficient so as to determine the pressure appropriately, thereby decreasing the shift shock experienced by the vehicle occupant.

Since, however, the friction coefficient of the clutch changes not only by the oil viscosity, but also by the rotational difference of the clutch, it is preferable to calculate the clutch friction coefficient taking other parameters including the clutch rotational difference account.

BRIEF SUMMARY OF THE INVENTION

An object of this invention is therefore to overcome the aforesaid problems and to provide a control system for automatic vehicle transmission, which determines the hydraulic pressure to be supplied to the frictional engaging element such as a hydraulic clutch, taking the performance of tracking or follow-up of the hydraulic pressure into account, to enhance the control toughness against the engine speed change, thereby decreasing the shift shock effectively so as to improve the feeling of the vehicle occupant, while ensuring to prevent the engine from revving over or excessively.

Another object of this invention is therefore to overcome the aforesaid problems and to provide a control system for automatic vehicle transmission, which calculates the friction coefficient of the frictional engaging element such as a hydraulic clutch additionally taking parameters including the rotational difference thereof into account to determine the pressure to be supplied to the frictional engaging element, thereby decreasing the shift shock effectively so as to improve the feeling of the vehicle occupant.

In order to achieve the objects, in a first aspect, there is provided a system for controlling an automatic transmission of a vehicle having an input shaft connected to an internal combustion engine mounted on the vehicle and an output shaft connected to driven wheels of the vehicle, the transmission transmitting input torque, through any of frictional engaging elements, generated by the engine and inputted by the input shaft to the driven wheels by the output shaft, in accordance with predetermined shift scheduling defining a target gear based on detected operating conditions of the vehicle and the engine, comprising; input shaft rotational speed detecting means for detecting input shaft rotational speed inputted to the transmission; input torque calculating means for calculating the input torque inputted to the transmission; reached-pressure determining means for determining a reached-pressure based on at least the calculated input torque; maximum control response value determining means for determining a maximum value in pressure control response set with respect to a desired reaching time in accordance with a predetermined characteristic, based on at least the detected input shaft rotational speed and the determined reached-pressure; actual control response value determining means for determining an actual value in the pressure control response based on at least the determined reached-pressure relative to the desired reaching time; desired value determining means for comparing the determined maximum value and the determined actual value to determine the pressure control response and for determining a desired value to be supplied to one of the frictional engaging elements of the target gear to be shift to, based on the determined pressure control response; hydraulic pressure calculating means for calculating hydraulic pressure to be supplied to the one of the frictional engaging elements based on the desired value; and hydraulic pressure control circuit for supplying hydraulic pressure to the frictional engaging elements based on at least the calculated hydraulic pressure.

In a second aspect, there is provided a system for controlling an automatic transmission of a vehicle having an input shaft connected to an internal combustion engine mounted on the vehicle and an output shaft connected to driven wheels of the vehicle, the transmission transmitting input torque, through any of frictional engaging elements, generated by the engine and inputted by the input shaft to the driven wheels by the output shaft, in accordance with predetermined shift scheduling defining a target gear based on detected operating conditions of the vehicle and the engine, comprising; input shaft rotational speed detecting means for detecting input shaft rotational speed inputted to the transmission; output shaft rotational speed detecting means for detecting an output shaft rotational speed to be outputted from the transmission; temperature detecting means for detecting a temperature of oil generating the hydraulic pressure; viscosity parameter calculating means for calculating a viscosity parameter indicative of viscosity of the oil based on the detected temperature of the oil in accordance with a predetermined characteristic; desired torque calculating means for calculating a desired torque necessary for effecting shift to be supplied to one of the frictional engaging elements of the target gear; surface pressure calculating means for calculating a surface pressure acting on the one of the frictional engaging elements based on at least the desired torque; clutch parameter calculating means for calculating a clutch parameter indicative of condition of the frictional engaging elements based on at least the calculated viscosity parameter, the surface pressure, the detected input shaft rotational speed and the detected output shaft rotational speed; friction coefficient calculating means for calculating a friction coefficient of the frictional engaging elements based on the calculated clutch parameter in accordance with a predetermined second characteristic; conversion means for converting the desired torque into the hydraulic pressure value using at least the calculated frictional coefficient and. hydraulic pressure control circuit for supplying the calculated hydraulic pressure to the one of the frictional engaging elements based on at least the calculated hydraulic pressure.

BRIEF DESCRIPTION OF THE DRAWINGS

This and other objects and advantages of the invention will be more apparent from the following description and drawings, in which.

DETAILED DESCRIPTION OF THE PREFERRED EMBODIMENTS

An embodiment of the invention will now be explained with reference to the attached drawings.

Figure 1:
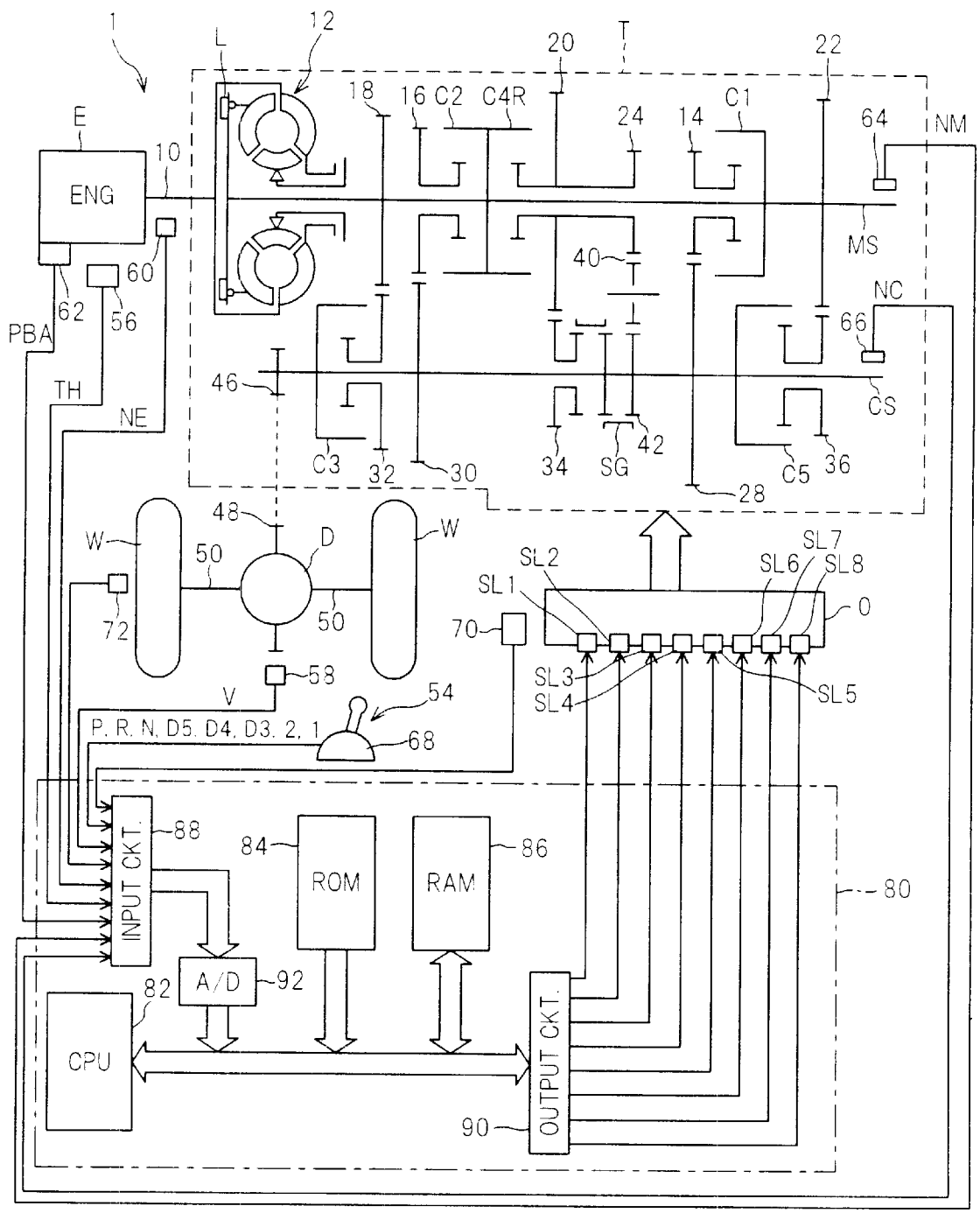
FIG. 1 is an overall schematic view of a control system for an automatic vehicle transmission according to the invention.

FIG. 1 is an overall schematic view of a control system for an automatic vehicle transmission according to the invention.

As shown in FIG. 1, a vehicle 1, illustrated partially by a driven wheel W (referred to later), etc., has an internal combustion engine E (referred to simply as "engine") mounted thereon and an automatic vehicle transmission T (referred to simply as "transmission"). The transmission T comprises the type of parallel-installed-shafts of five forward ratios.

Specifically, the transmission T is equipped with a main shaft (transmission input shaft) MS connected to a crankshaft 10 of the engine E through a torque converter 12 having a lockup mechanism L, and a countershaft CS provided in parallel with the main shaft MS. These shafts carry gears.

More specifically, the main shaft MS carries a main first gear 14, a main second gear 16, a main third gear 18, a main fourth gear 20, a main fifth gear 22 and a main reverse gear 24. The countershaft CS carries a counter first gear 28 which meshes with the main first gear 14, a counter second gear 30 which meshes with the main second gear 16, a counter third gear 32 which meshes with the main third gear 18, a counter fourth gear 34 which meshes with the main fourth gear 20, a counter fifth gear 36 which meshes with the main fifth gear 22 and a counter reverse gear 42 which meshes with the main reverse gear 24 through a reverse idle gear 40.

In the above, 1st gear (first speed or gear ratio) is established or effected when the main first gear 14 rotatably mounted on the main shaft MS is engaged with the main shaft MS by a first-gear hydraulic clutch C1. 2nd gear (second speed or gear ratio) is established when the main second gear 16 rotatably mounted on the main shaft MS is engaged with the main shaft MS by a second-gear hydraulic clutch C2. 3rd gear (third speed or gear ratio) is established when the counter third gear 32 rotatably mounted on the countershaft CS is engaged with the countershaft CS by a third-gear hydraulic clutch C3.

4th gear (fourth speed or gear ratio) is established when the counter fourth gear 34 rotatably mounted on the countershaft CS is engaged with the countershaft CS by a selector gear SG and with this state maintained, the main fourth gear 20 rotatably mounted on the main shaft MS is engaged with the main shaft MS by a fourth-gear/reverse hydraulic clutch C4R. 5th gear (fifth speed or gear ratio) is established when the counter fifth gear 36 rotatably mounted on the countershaft CS is engaged with the countershaft CS by a fifth-gear hydraulic clutch C5.

The reverse gear is established when the counter reverse gear 42 rotatably mounted on the countershaft CS is engaged with the countershaft CS by the selector gear SG and with this state maintained, the main reverse gear 24 rotatably mounted on the main shaft MS is engaged with the main shaft MS by the fourth-gear/reverse hydraulic clutch C4R.

The rotation of the countershaft CS is transmitted through a final drive gear 46 and a final driven gear 48 to a differential D, from where it is transmitted to the driven wheels W, through left and right drive shafts 50, 50 of the vehicle 1 on which the engine E and the transmission T are mounted.

A shift lever 54 is installed on the vehicle floor near the operator's seat to be manipulated by the vehicle operator to select one from among eight positions P, R, N, D5, D4, D3, 2 and 1.

A throttle position sensor (engine load detecting means) 56 is provided in the air intake pipe (not shown) of the engine E at a point in the vicinity of a throttle valve (not shown) and generates a signal indicative of the degree of throttle valve opening TH. A vehicle speed sensor 58 is provided in the vicinity of the final driven gear 48 and generates a signal indicative of the vehicle traveling speed V once every rotation of the final driven gear 48.

A crankshaft sensor 60 is provided in the vicinity of the crankshaft of the engine E and generates a CYL signal once every a predetermined crank angular position of a predetermined cylinder, a TDC signal at a predetermined crank angular position of each cylinder and a CRK signal at a predetermined crank angular position (such as 15 crank angles) obtained by dividing the interval between the TDC signals. A manifold absolute pressure sensor 62 is installed in the air intake pipe of the engine E at a point in the vicinity of the throttle valve and generates a signal indicative of the manifold absolute pressure PBA indicative of the engine load.

A first rotational speed sensor 64 is provided in the vicinity of the main shaft MS and generates a signal indicative of the rotational speed NM of the transmission input shaft from the rotation of the main shaft MS. A second rotational speed sensor 66 is provided in the vicinity of the countershaft CS and generates a signal indicative of the rotational speed NC of the transmission output shaft from the rotation of the countershaft CS.

A shift lever position switch 68 is provided in the vicinity of the shift lever 54 and generates a signal indicating which of the aforesaid eight positions is selected by the vehicle operator. An oil temperature sensor 70 is installed in the transmission T or at an appropriate location close thereto and generates a signal indicative of the oil temperature, i.e., the temperature TATF of Automatic Transmission Fluid. And a brake switch 72 is provided in the vicinity of a brake pedal (not shown) and generates an ON signal when the brake pedal is depressed by the vehicle operator.

The outputs of the sensors 56, etc., are sent to an ECU (electronic control unit) 80. The ECU is constituted as a microcomputer comprising a CPU (central processing unit) 82, a ROM (read-only memory) 84, a RAM (random access memory) 86, an input circuit 88, an output circuit 90 and an A/D converter 92. The outputs of the sensors 56, etc., are inputted to the microcomputer from the input circuit 88.

The analog outputs of the sensors are converted into digital values through the A/D converter 92 and are stored in the RAM 86, while the digital outputs of the sensors are processed by a processing circuit such as a wave-form shaper (not shown) and are similarly stored in the RAM 86.

The outputs of the vehicle speed sensor 58 and the CRK signal outputted by the crank angle sensor 60 are inputted to a counter (not shown) to be counted to determine the vehicle speed V and the engine speed NE. Similarly, the outputs of the first and second rotational speed sensors 64, 66 are counted by the counter to determine the input shaft rotation speed NM and the output rotation speed NC of the transmission T.

The CPU 82 of the microcomputer determines the (target) gear (gear ratio) to be shifted to and energizes/deenergeizes shift solenoids SL1 to SL5 (each comprises an electromagnetic solenoid) of a hydraulic pressure control circuit O, through the output circuit 90 and a voltage pressure circuit (not shown), to control the supply of the hydraulic pressure to the clutches (frictional engaging elements) such that the shift is effected, and energizes/deenergizes linear solenoids SL6 to SL8 (each comprises an electromagnetic solenoid) to control the operation of the lockup clutch L of the torque converter 12.

The operation of the control system of an automatic vehicle transmission according to the invention will be explained.

Figure 2:
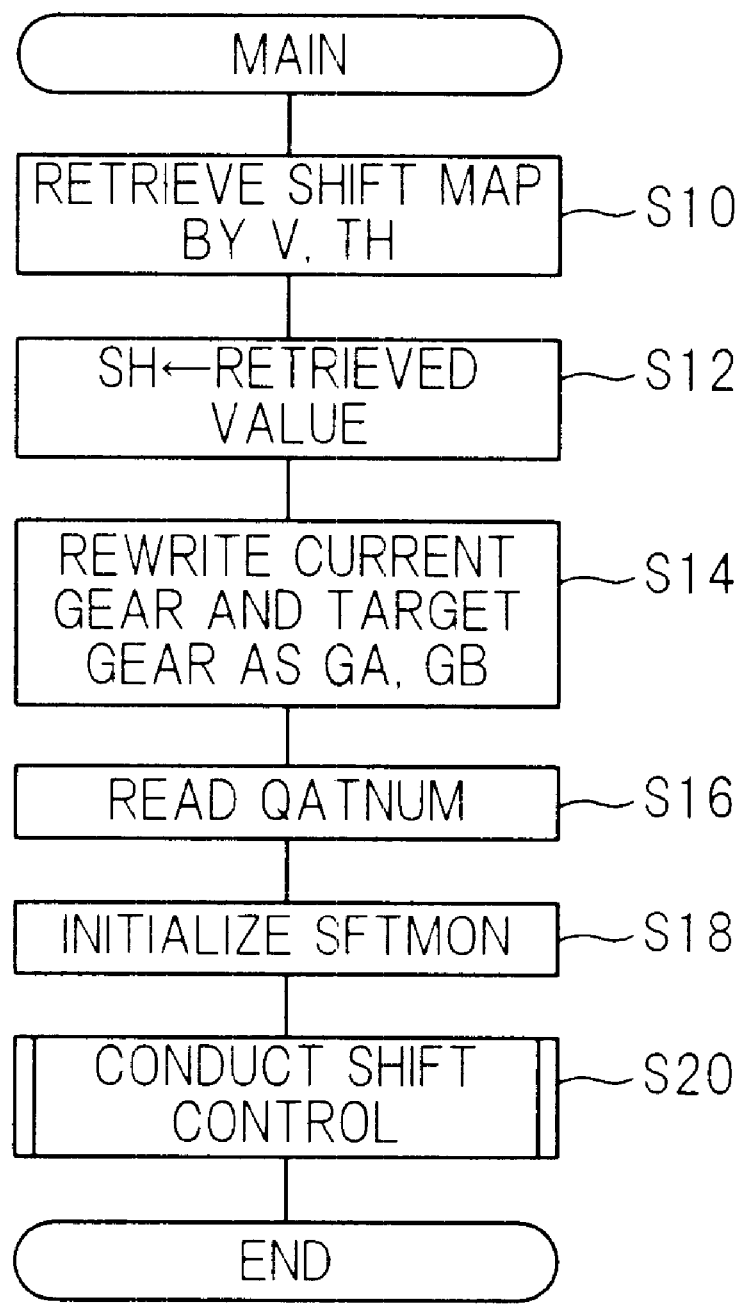
FIG. 2 is a main flow chart showing the operation of the system illustrated in FIG. 1.

FIG. 2 is a flow chart showing the operation of the system. The program illustrated here is executed once every 10 msec.

Explaining this, the program begins in S10 in which a known shift map (shift scheduling map; not shown) is retrieved using the detected vehicle speed V and the throttle opening TH, and proceeds to S12 in which the retrieved value is determined to be a target gear (to be engaged with or shifted to) SH. The program then proceeds to S14 in which the current gear (now being engaged) is rewritten as or named GA and the target gear SH is rewritten as or renamed GB.

The program then proceeds to S16 in which QATNUM (indicative of shift mode) is read. The shift mode QATNUM is prepared in a memory of the RAM 86 (or ROM 84) and indicates the mode of shift. Specifically, it is expressed, for example, as 11h (indicating upshift from 1st to 2nd gear), 12h (indicating upshift from 2nd to 3rd gear), 21h (indicating downshift from 2nd to 1st), 31h (indicating that 1st gear should be held). More specification, the first numeral of the shift mode QATNUM indicates the mode of shift as 1: upshifting, 2: downshifting and 3: holding current gear. In the below, it will be mentioned that whether the shift mode QATNUM is 1*h, for example. This means that it should be determined that the shift is, whichever the gear is, upshifting.

The program then proceeds to S18 in which SFTMON (indicative of shift monitor) is initialized to 0, when it is determined that shift control is needed from the processing in S10 and on. The SFTMON is prepared in a memory of the RAM 86 (or ROM 84) and indicates the time of the shift control. The program then proceeds to S20 in which the shift control is conducted, if needed. If the first numeral of the shift mode QATNUM is 3, the current gear is held and no shift control is implemented.

Figure 3:
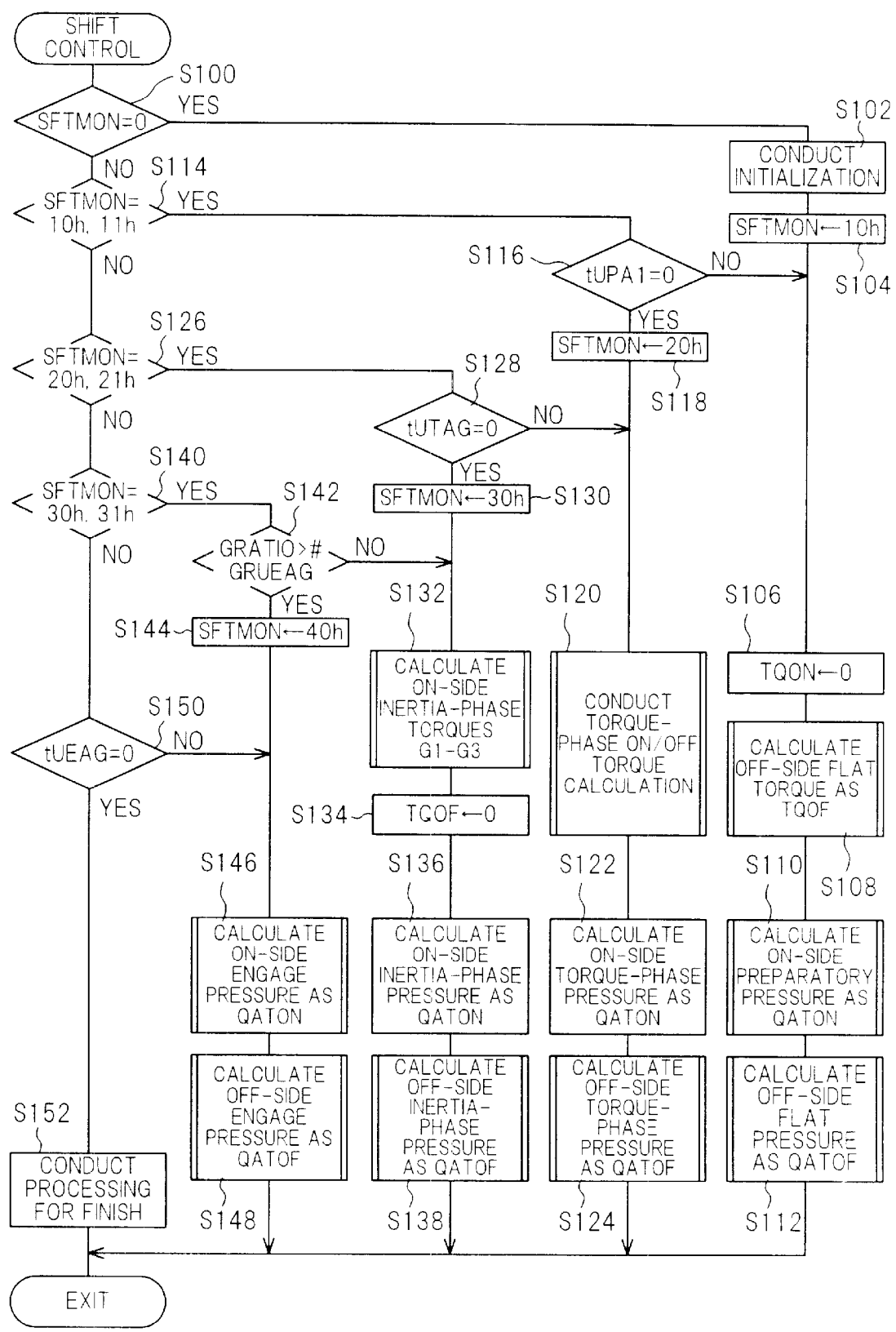
FIG. 3 is a flow chart showing the subroutine of conducting shift control referred to in the flow chart of FIG. 2.

FIG. 3 is a flow chart showing the subroutine of the shift control referred to in S20 of FIG. 2. The program illustrates the shift control taking the upshift as an example of the shift.

In the below, the shift control is explained with respect to the upshift, more specifically the upshift from 1st to 2nd gear. In other words, it is assumed that the current gear GA is 1st and the target gear GB is 2nd.

Figure 4:
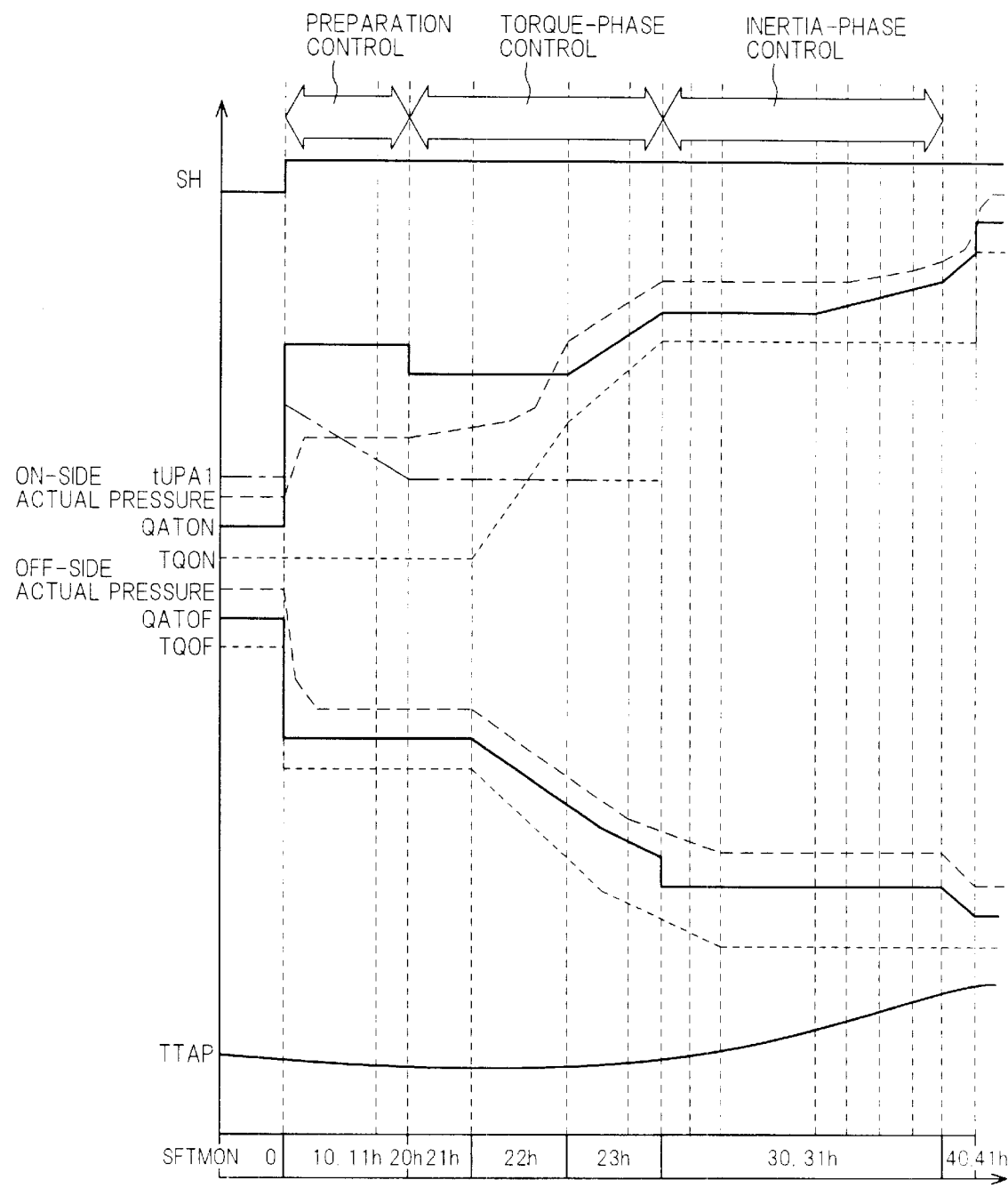
FIG. 4 is a time chart showing the control points referred to in the flow chart of FIG. 3.

Explaining the upshift control illustrated in the flow chart referring to a time chart shown in FIG. 4, the program begins in S100 in which it is determined whether the bit of the aforesaid value SFTMON is 0. Since the value has been initialized to 0 in S18, the result is affirmative and the program proceeds to S102 in which initialization is conducted such that parameters or variables including a desired clutch torque as well as timer or counter values (all explained later) are all initialized. The program then proceeds to S104 in which the value of SFTMON is set to 10h.

The program then proceeds to S106 in which, since it is a time to start preparation of shift control as illustrated in the time chart of FIG. 4, an ON-side desired clutch torque for the target gear to be shifted to, hereinafter referred to as "TQON", i.e. for the 2nd clutch C2 which effects the target gear (2nd gear), is set to 0, and to S108 in which an OFF-side flat torque is calculated as an OFF-side desired clutch torque (for the current gear (i.e. 1st clutch C1) to be released), hereinafter referred to as "TQOF", at this stage, such that the engine torque is maintained.

In the specificate and figures, the term "ON-side" indicates the clutch to be engaged (i.e., that for the target gear) and the term "OFF-side" indicates the clutch to be relieved or disengaged (i.e. that for the current gear). And the word "flat" indicates a flat portion in the wave-form of the hydraulic pressure or torque.

Figure 5:
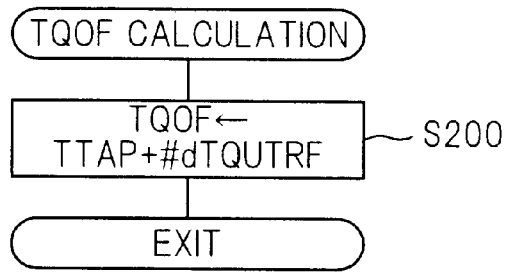
FIG. 5 is a flow chart showing the subroutine of calculating the OFF-side desired clutch torque TQOF to be determined as a flat torque at this stage.

FIG. 5 is a flow chart showing the subroutine for calculating the OFF-side desired clutch torque TQOF to be determined as a flat torque at this stage.

In S200, an available additive torque value #dTQUTRF is added to the engine torque (more precisely an estimated input torque; explained later) TTAP and the sum is defined as the OFF-side desired clutch torque TQOF.

Returning to the explanation of the flow chart of FIG. 3, the program proceeds to S110 in which an ON-side preparatory pressure is calculated as an ON-side clutch pressure for the clutch (C2) for effecting the target gear to be engaged, referred to as "QATON", at this stage. This corresponds to fill a clutch-stroke play with oil and removing the play.

Figure 6:
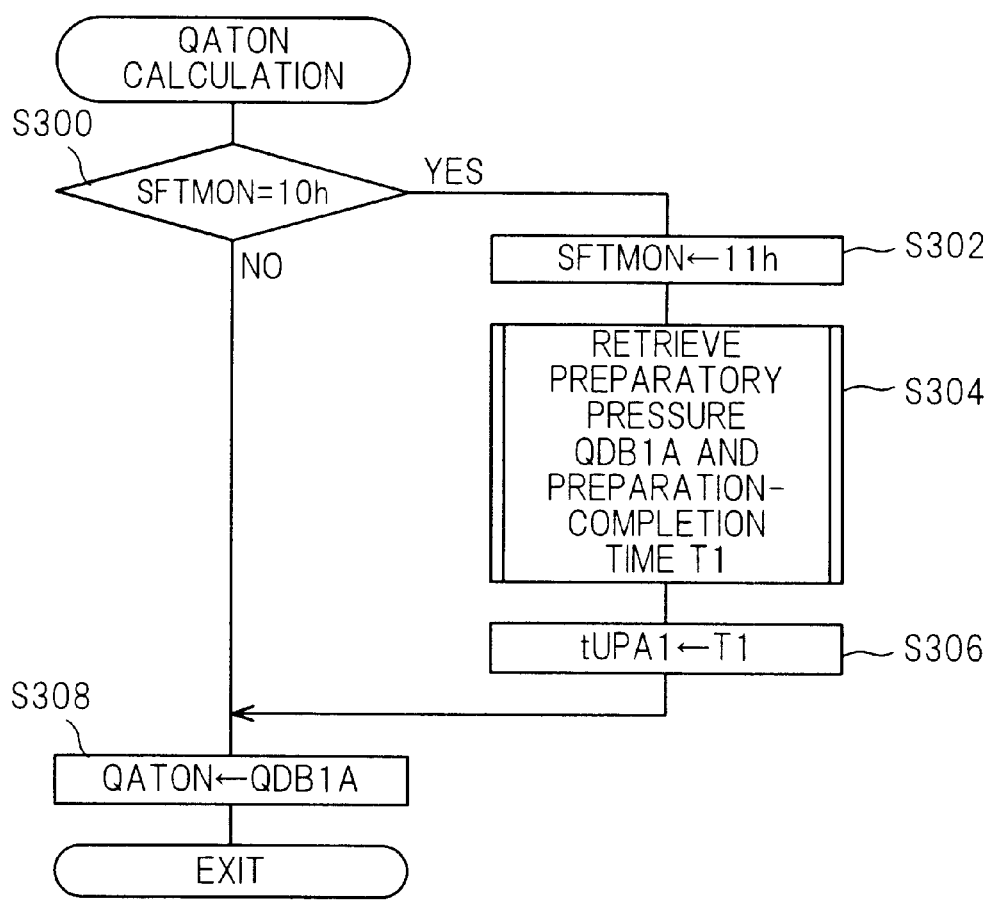
FIG. 6 is a flow chart showing the subroutine of calculating the ON-side clutch pressure QATON to be determined as a preparatory pressure at this stage and referred to in the flow chart of FIG. 3.

FIG. 6 is a flow chart showing the subroutine for calculating the ON-side clutch pressure QATON to be determined as the preparatory pressure at this stage.

Before entering the explanation of the flow chart, the calculation of the ON-side clutch pressure (as the preparatory pressure for removing the clutch-stroke play) in the system of the embodiment will be explained.

Briefing the system, the preparatory pressure and a supply time (during which the supply of pressure is continued) are determined based on the rotational speed of the clutch concerned (i.e. 2nd clutch C2 in this case) and the ATF temperature. The supply time varies depending upon various factors such as the manipulated variable (supplied pressure), the clutch rotational speed, the ATF temperature, a shift interval (an interval between a time point at which the manipulated variable was made zero for a given clutch and a time point at which the manipulated variable is again given for the same clutch), the position of the clutch (height or distance from the reservoir in the drainage), the length of passage for supply and draining oil, the number of shift valves involved, the characteristics of the shift solenoid(s) (actuator(s)) SLn, and the manufacturing variance of the clutch (such as volume, the spring constant, etc).

In view of the above, in the system, from among the factors, the position of the clutch, the length of passage for supply and draining oil and the number of shift valves involved are predetermined in advance for respective clutches and stored in a memory of the ROM 84 (or RAM 86), while the characteristics of the shift solenoid(s), the manufacturing variance of the clutch, etc. are to be compensated in the entire system of the shift control.

The compensation in the entire system of the shift control will be explained.

Figure 7:
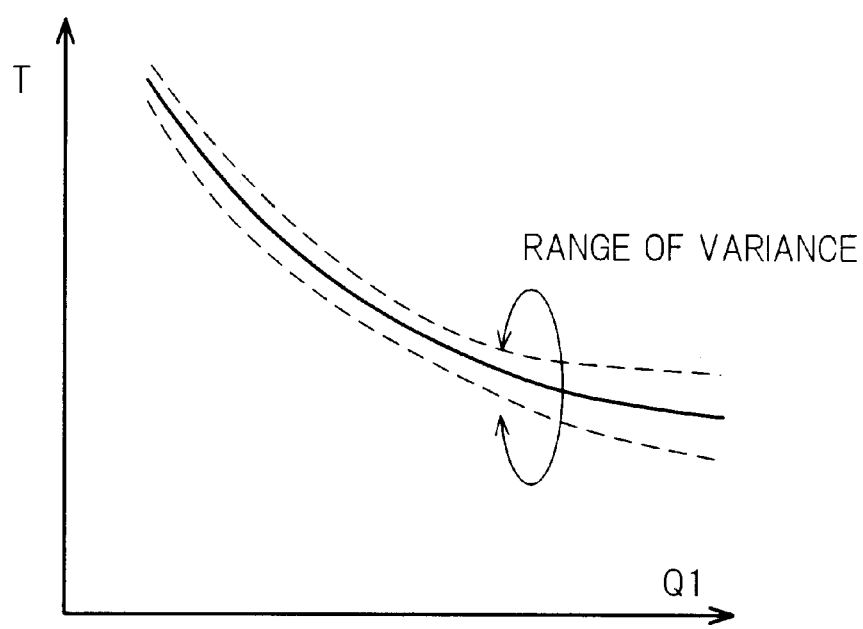
FIG. 7 is a graph showing the relationship between the manipulated variable and the a range of variance in calculating the pressure referred to in the flow chart of FIG. 6.
Figure 8:
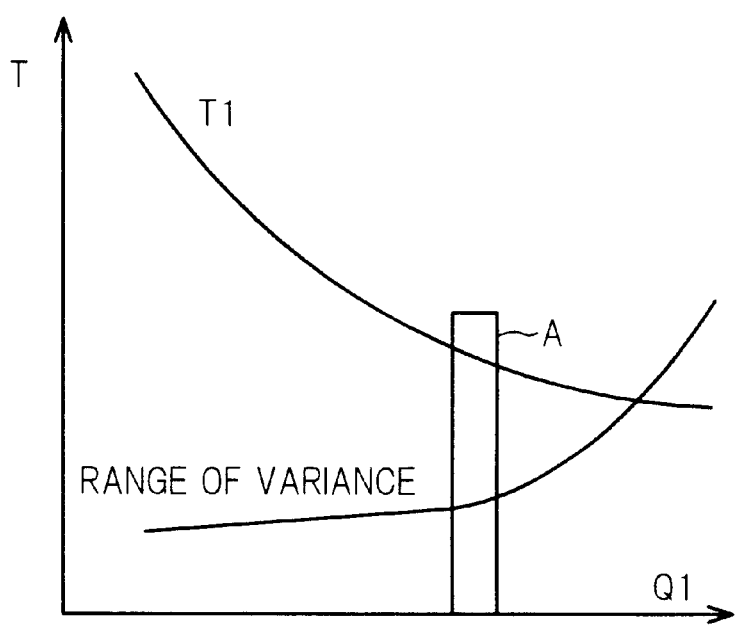
FIG. 8 is a graph similarly showing the relationship between the manipulated variable and the range of variance in calculating the pressure referred to in the flow chart of FIG. 6.

Since a time necessary for completing or finishing the preparation (preparation-completion time) decreases as the manipulated variable (QATON) increase, it will be effective to determine the manipulated value to an increased amount. However, as illustrated in FIG. 7, the range of variance increases with increased manipulated variable (shown as "Q1" in FIGS. 7 to 9), which degrades the control accuracy. For this reason, as illustrated in FIG. 8, the manipulated variable (and the shift interval) are to be predetermined in advance in a narrow range marked by A such that both the control accuracy and control response are satisfied.

Figure 9:
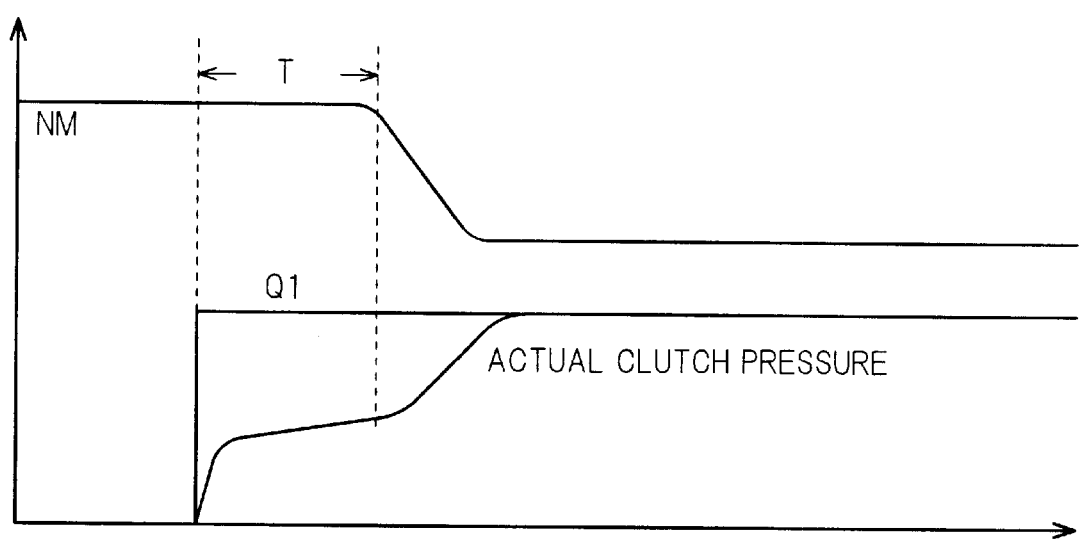
FIG. 9 is a time chart showing the measurement of a preparation-completion time referred to in the flow chart of FIG. 6.

Then, with respect to the manipulated variable and the shift interval thus predetermined, as illustrated in FIG. 9, by measuring the preparation-completion time T by changing the clutch rotational speed (input shaft rotational speed NM) and the ATF temperature, it becomes possible to collect data necessary for the respective clutches. And using the collected data as a base, as regards the shift interval, a residual oil amount (the residual amount of ATF or oil in the clutch) is estimated and the preparation-completion time T is corrected by the estimated residual oil amount.

Figure 10:
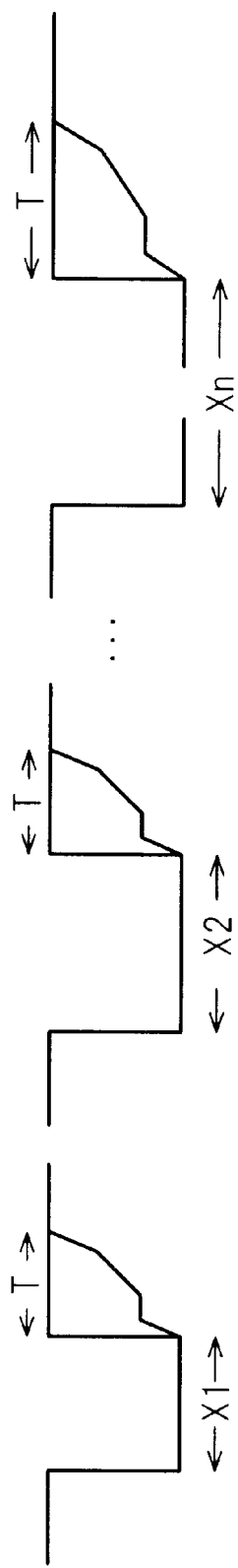
FIG. 10 is an explanatory time chart similarly showing the measurement of the preparation-completion time referred to in the flow chart of FIG. 6, by changing a shift interval.
Figure 11:
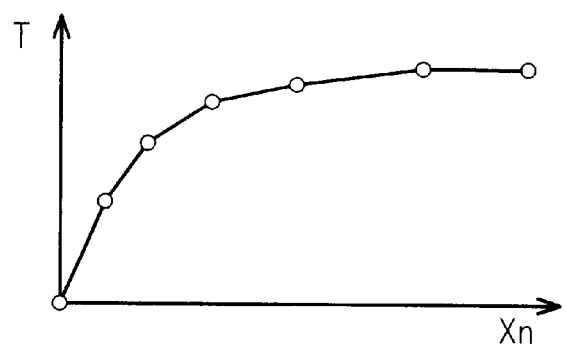
FIG. 11 is a graph showing the relationship between the preparation-completion time and the shift interval illustrated in FIG. 10.
Figure 12:
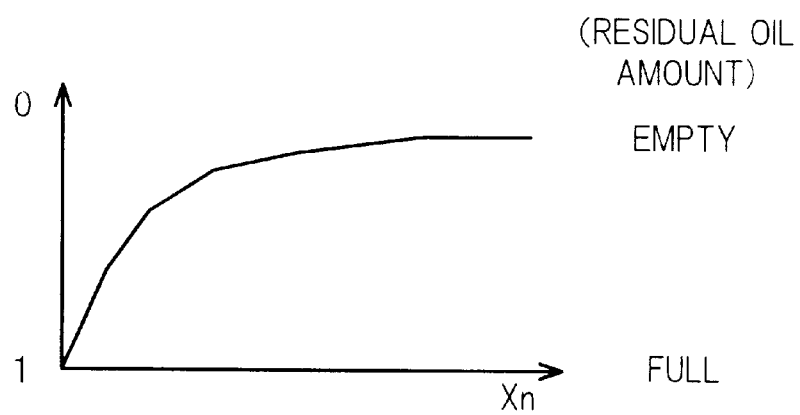
FIG. 12 is a graph showing the preparation-completion time normalized relative to the shift interval illustrated in FIG. 11.

Explaining the data collection, as illustrated in FIG. 10, the preparation-completion time T is measured by changing the shift interval Xn (shown as "X1""X2""Xn" in the figure). Then, graphing the relationship between the shift interval (generally expressed as "Xn") and the preparation-completion time T as illustrated in FIG. 11, the preparation-completion time T is normalized between 0 (in-clutch oil empty) and 1 (in-clutch oil full) relative to the shift interval Xn, as illustrated in FIG. 12.

Figure 13:
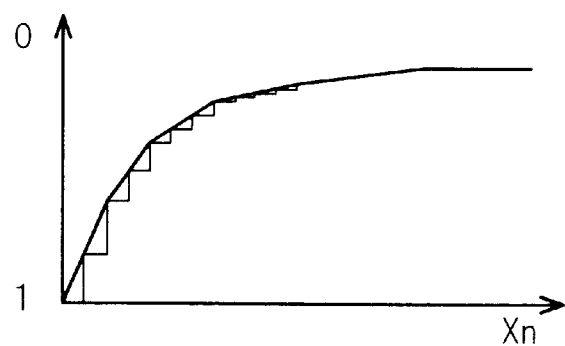
FIG. 13 is a graph showing oil decreasing amounts relative to the shift interval obtained by converting the characteristics illustrated in FIG. 12.
Figure 14:
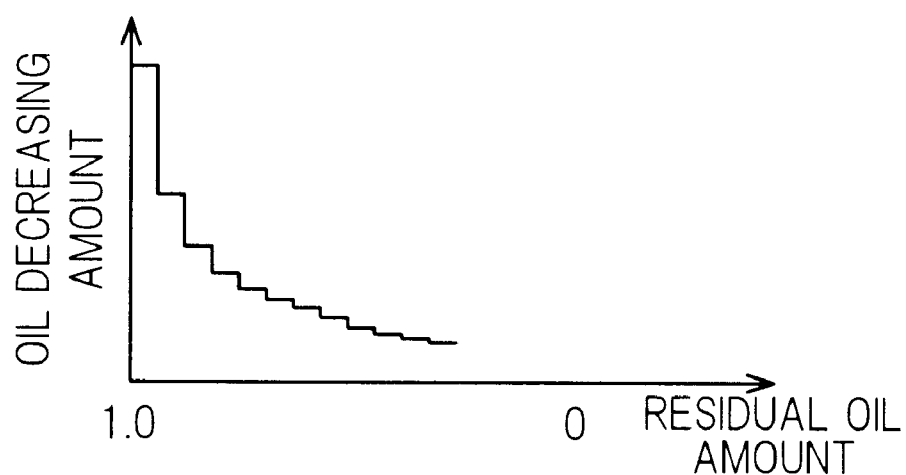
FIG. 14 is a graph showing oil decreasing amounts relative to a residual oil amount obtained by converting the characteristics illustrated in FIG. 13.

Then, as illustrated in FIG. 13, an oil decreasing amount (oil decreasing rate) relative to the shift interval Xn is calculated and is graphed. Then, as illustrated in FIG. 14, the oil decreasing amount relative to the shift interval is converted into an oil decrease amount (oil decreasing rate) relative to the residual oil amount. The oil decreasing amount is hereinafter referred to as "dOIL".

Specifically, the values (i.e. slopes) relative to the residual oil amount illustrated in FIG. 13 is retrieved each time a predetermined period of time has elapsed (i.e., each time the program is looped) since the manipulated variable was made zero, and the retrieved value is successively subtracted from the residual oil amount. Accordingly, when the manipulated variable is kept zero for a relatively long period of time, the residual oil amount will be estimated to be zero.

Figure 15:
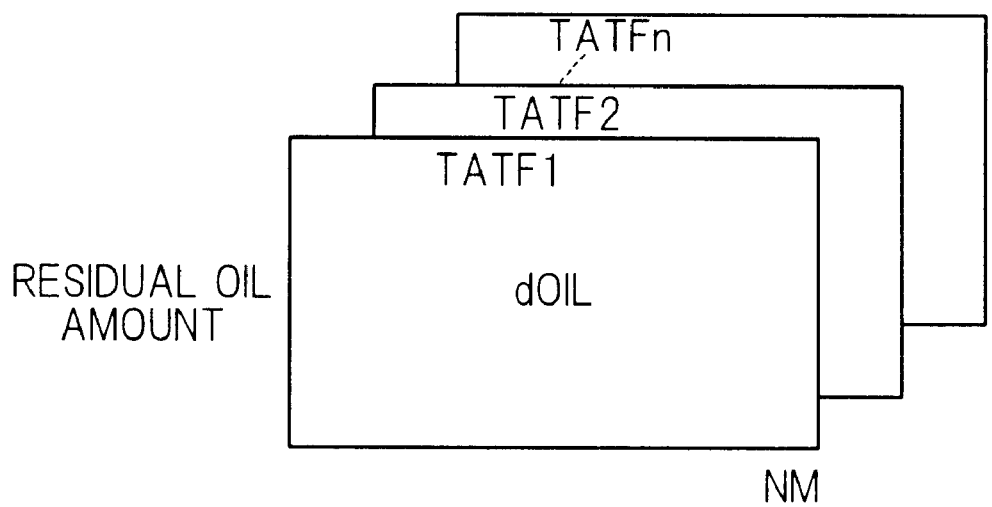
FIG. 15 is an explanatory view of mapped data of the oil decreasing amount dOIL illustrated in FIG. 14, to be retrieved by the residual oil amount, the input shaft rotational speed NM and the ATF temperature.
Figure 16:
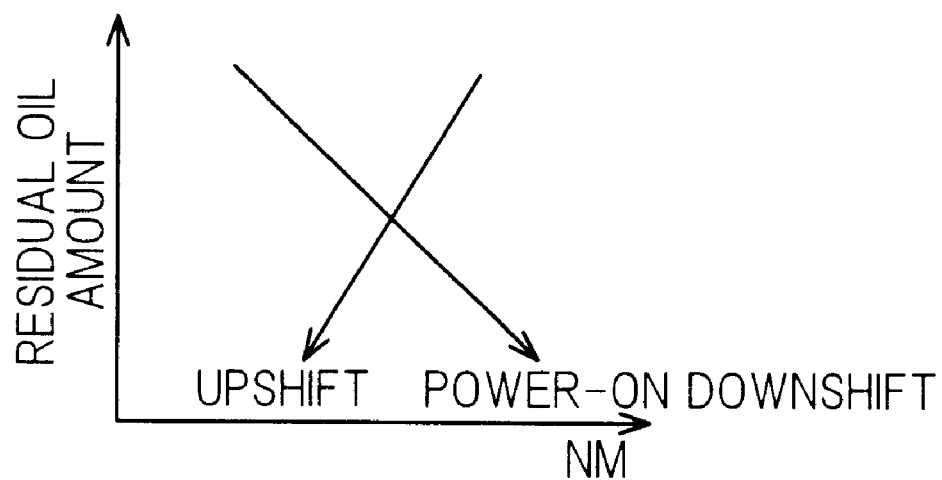
FIG. 16 is a graph showing the oil decreasing amount, illustrated in FIG. 14, relative to the residual oil amount, the input shaft rotational speed NM and the direction of shift.

Then, as illustrated in FIG. 15, the oil decreasing amount dOIL relative to the residual oil amount and the input shaft rotational speed NM is prepared as mapped data with respect to the ATF temperatures TATF1, 2, . . . n. Thus, by retrieving the mapped data, it becomes possible to determine the change of the residual oil amount relative to the change of the input shaft rotational speed NM, as shown in FIG. 16.

Figure 17:
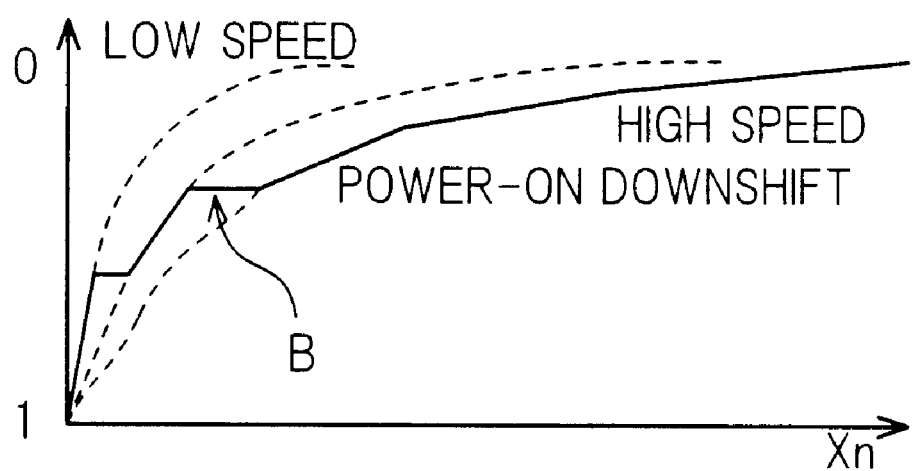
FIG. 17 is a graph showing characteristics, similar to that illustrated in FIG. 16, of the prior art.

To be more specific, as illustrated in FIG. 17 with B, if the residual oil amount were stored relative to the shift interval Xn solely, it would discontinuously change to and fro in the direction of time. As a result, it would be quite difficult to determine the residual oil amount change relative to the change of the input shaft rotational speed because of the difficulty in tracking or following up the rotational speed change. However, having been configured in the above, it becomes possible to determine the residual oil amount relative to the change of the input shaft rotation speed NM.

Thus, the system is configured such that, the preparation-completion time T when the residual oil amount is zero is stored in a memory and the residual oil amount OILn from the oil decreasing amount dOIL is calculated, and based thereon, an actual preparation-completion time (control time; referred to as "T1") is to be calculated In the residual oil amount OILn, n is one from among 1 to 5 and indicates the residual oil amount in any of the five clutches corresponding to the number.

Based on the above, the calculation of the ON-side clutch pressure QATON (as the preparatory pressure at this stage) will be explained with reference to the flow chart of FIG. 6.

The program begins in S300 in which it is determined whether the value of SFTMON is 10h. Since it has been set to 10h in S104 in the flow chart of FIG. 3, the result is affirmative and the program proceeds to S302 in which the value of SFTMON is rewritten as 11h. The program then proceeds to S304 in which the ON-side preparatory pressure (hereinafter referred to as "QDB1A" (for the 2nd clutch C2 in this case) and the aforesaid actual preparation-completion time T1 are retrieved.

Figure 18:
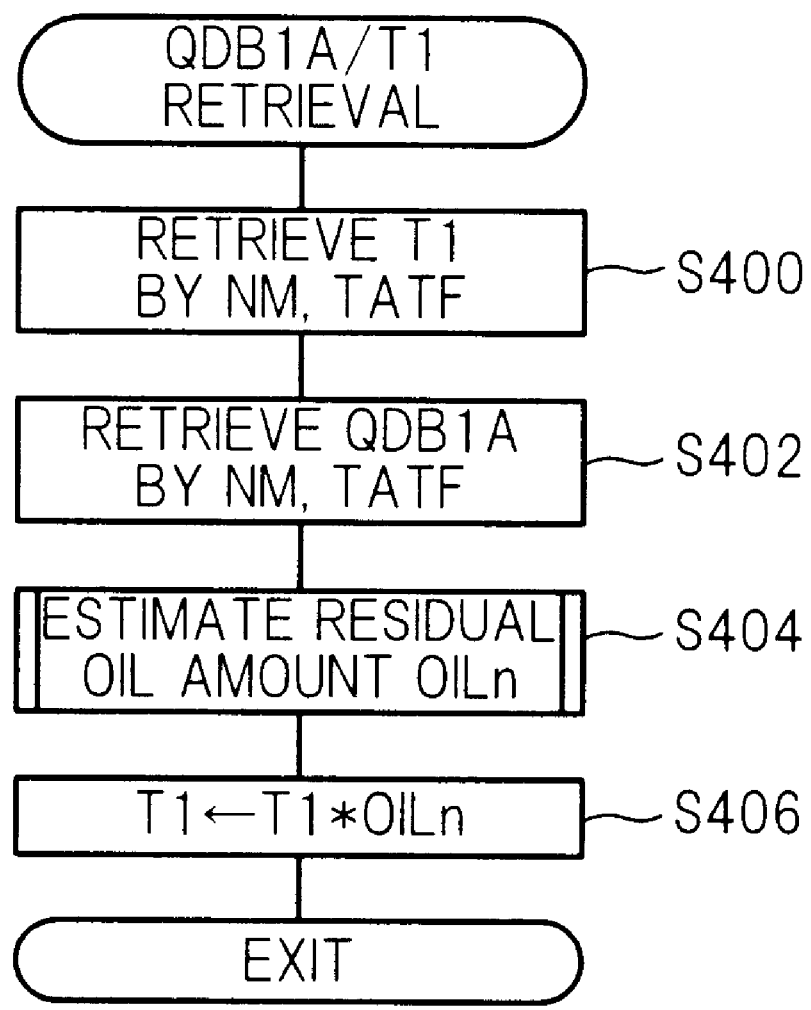
FIG. 18 is a flow chart showing the subroutine of calculating the ON-side preparatory pressure QDB1A, etc. referred to in the flow chart of FIG. 6.

FIG. 18 is a flow chart for the subroutine of the retrieval.

The program begins in S400 in which the actual preparation-completion time T1 is retrieved from mapped data (whose characteristics are not illustrated) using the detected input shaft rotational speed NM and the ATF temperature TATF as address data. The program then proceeds to S402 in which the preparatory pressure QDB1A is retrieved from mapped data (whose characteristics are not illustrated) using the same parameters as the address data. The program then proceeds to S404 in which the aforesaid residual oil amount OILn is estimated.

Figure 19:
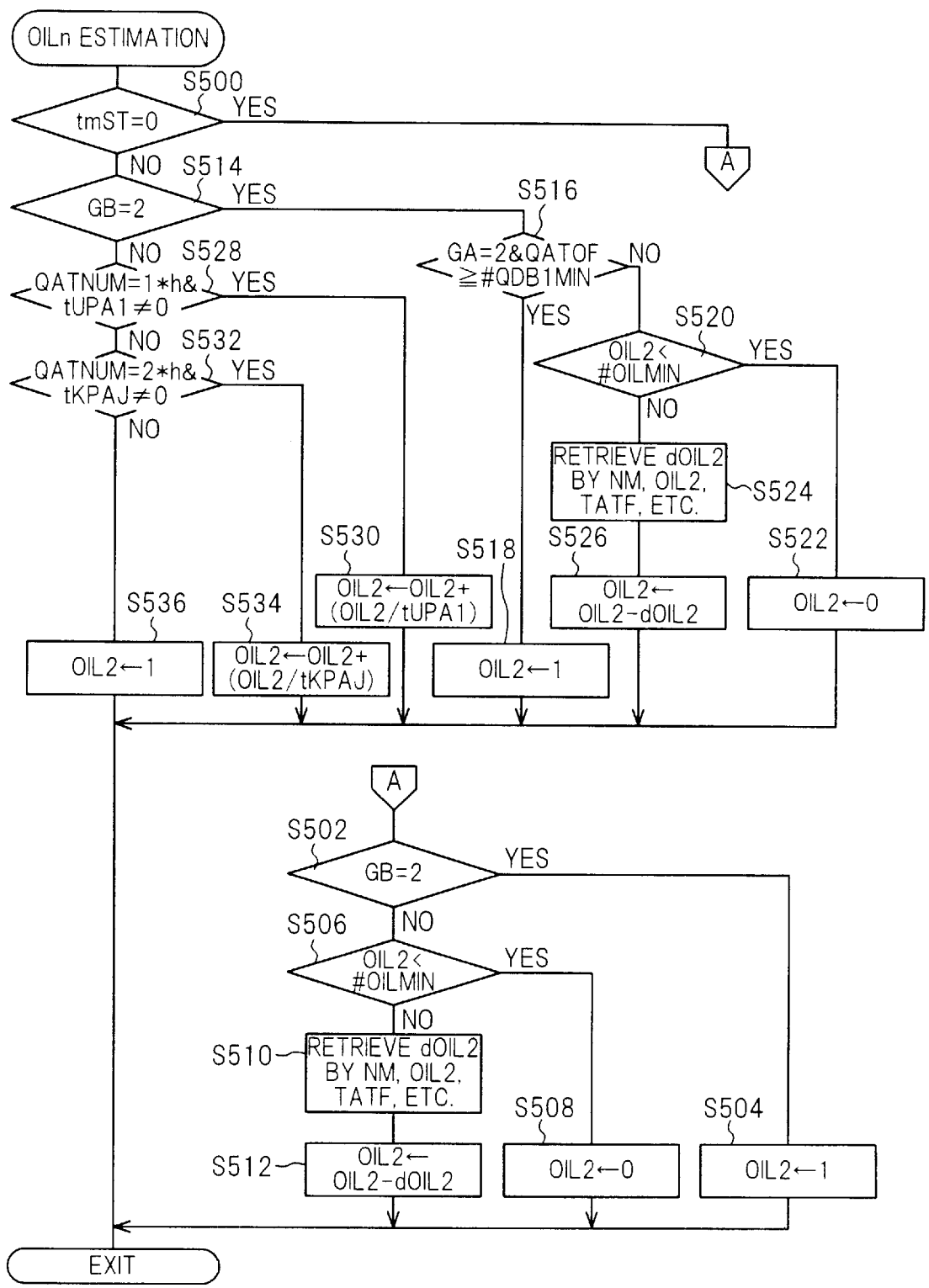
FIG. 19 is a flow chart showing the subroutine of estimating the residual oil amount referred to in the flow chart of FIG. 18.

FIG. 19 is a flow chart showing the subroutine for the estimation.

The program is executed separately for the five clutches C1 to C5. Although, for the purpose of brevity, general explanation will be made taking the 2nd clutch C2 as an example, that will similarly be applied to the other four clutches.

The program begins in S500 in which it is determined whether the value of a timer tmST (down-counter) is 0. The value of timer is reset to 0 in S102 in the flow chart of FIG. 3, when the shift is not in progress, in other words, when the value of SFTMON is 0 in the time chart of FIG. 4.

When the result in S500 is affirmative, the program proceeds to S502 in which it is determined whether the target gear GB is 2nd. When the result is affirmative, since the shift is not in progress such that the 2nd clutch C2 is engaged (made ON), the program proceeds to S504 in which the residual oil amount OIL2 (the residual oil amount in 2nd clutch C2 (preceding value)) is determined to be 1, in other words, it is estimated that the second clutch C2 is filled with oil.

When the result in S502 is negative, the program proceeds to S506 in which it is determined whether the residual oil amount (of the second clutch C2) OIL2 is less than a predetermined value #OILMIN. When the result is affirmative, the program proceeds to S508 in which it is estimated that the residual oil amount (preceding value) is 0, in other words, it is estimated that the second clutch C2 is empty.

On the other hand, when the result in S506 is negative, the program proceeds to S510 in which the oil decreasing amount dOIL2 is retrieved from one from among mapped data (which are prepared separately for the ATF temperature TATF and the length of oil passage for supply and drainage of the clutch concerned) using the detected input shaft rotational speed NM and the residual oil amount OIL2. The program then proceeds to S512 in which the oil decreasing amount dOIL2 is subtracted from the residual oil amount OIL2 to correct the same.

When the result in S500 is negative, since this indicates that the shift is in progress, the program proceeds to S514 in which it is determined whether the target gear GB is 2nd. When the result in S514 is affirmative, the program proceeds to S516 in which it is determined whether the current gear GA is 2nd and the manipulated variable (OFF-side clutch pressure QATOF) is greater or equal to a predetermined value #QDB1MIN. When the result is affirmative, the program proceeds to S518 in which the residual oil amount OIL2 is determined to be 1.

When the result in S516 is negative, the program proceeds to S520 in which it is determined whether the residual oil amount OIL2 is less than the predetermined value #OILMIN. When the result is affirmative, the program proceeds to S522 in which the residual oil amount OIL2 is determined to be 0. When the result in S520 is negative, the program proceeds to S524 in which the oil decreasing amount dOIL2 is retrieved from the mapped data in the manner similar to that explained in S510, and to S526 in which the residual oil amount OIL2 is corrected in the manner similar to that explained in S512.

When the result in S514 is negative, the program proceeds to S528 in which it is determined whether the shift mode QATNUM is 1*h and the value of a timer tUPA1 (corresponding to the preparation-completion time) is not 0, in other words, it is determined whether the upshift is in progress. When the result is affirmative, the program proceeds to S530 in which a quotient (obtained by dividing the residual oil amount OIL2 by the timer value tUPA1) is added to the residual oil amount OIL2 to correct the same.

When the result in S528 is negative, the program proceeds to S532 in which it is determined whether the shift mode QATNUM is 2*h and the value of a timer tKPAJ is 0, in other words, it is determined whether the downshift is in progress. When the result is affirmative, the program proceeds to S534 in which a quotient (obtained by dividing the residual oil amount OIL2 by the timer value tKPAJ) is added to the residual oil amount OIL2 to correct the same. When the result in S532 is negative, the program proceeds to S536 in which the residual oil amount OIL2 is determined to be 1.

Returning to the explanation of the flow chart of FIG. 18, the program proceeds to S406 in which the actual preparation-completion time T1 is multiplied by the determined residual oil amount OILn to correct the same.

Returning to the explanation of the flow chart of FIG. 6, the program proceeds to S306 in which the determined actual preparation-completion time T1 is set on the timer tUPA1 to start time measurement. The program then proceeds to S308 in which the determined ON preparation pressure QDB1A is determined to be the ON-side clutch pressure QATON. This is the same when the result in S300 is negative.

Having been configured in the foregoing manner, the system according to the embodiment can determine the manipulated variable and the control time with a less variance and good control response, in response to the rising of the clutch pressure. Moreover, by estimating the residual oil amount (residual oil amount in the clutch) and by correct the control time by the estimated value, the system can realize an appropriate control even for continuous shifting.

Returning to the explanation of the flow chart of FIG. 3, the program proceeds to S112 in which an OFF-side flat pressure is calculated or determined as the OFF-side clutch pressure QATOF.

Figure 20:
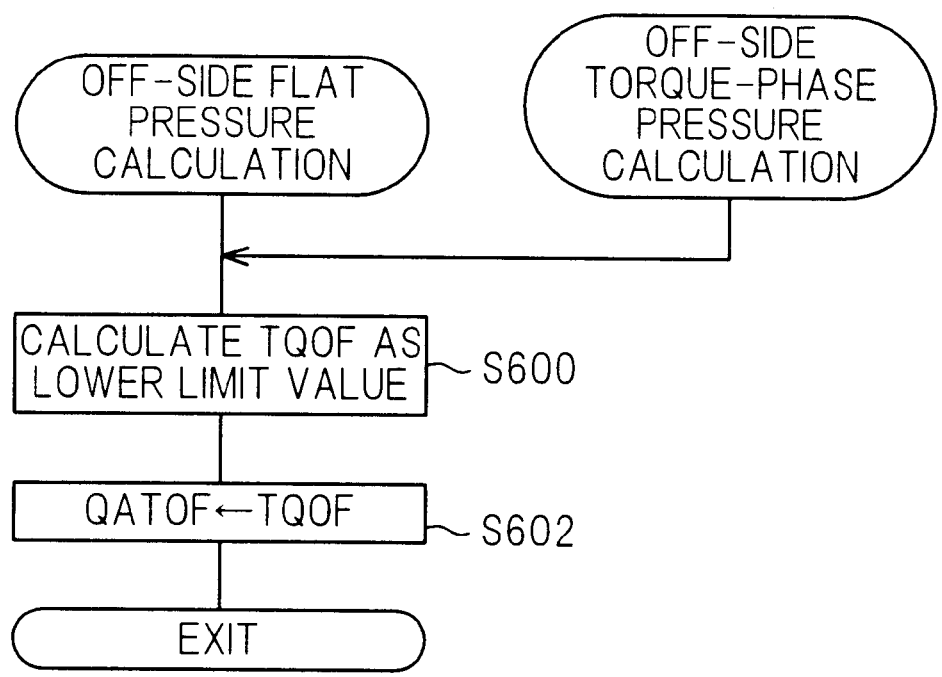
FIG. 20 is a flow chart showing the subroutine of calculating an OFF-side clutch pressure QATOF referred to in the flow chart of FIG. 3.

FIG. 20 is a flow chart for the subroutine of the calculation.

The program begins in S600 in which the OFF-side desired clutch torque TQOF is calculated as a lower limit value in an appropriate manner and proceeds to S602 in which the calculated value is determined to be the OFF-side clutch pressure QATOF.

Again returning to the flow chart of FIG. 3, in the next program loop, it is determined in S100 whether the value of SFTMON is 0. Since the value was set to 10h in S104 in the last program loop, the result in S100 is normally negative and the program proceeds to S114 in which it is determined whether the value of SFTMON is 10h or 11h (shown in FIG. 4).

When the result in S114 is affirmative, the program proceeds to S116 in which it is determined whether the value of the timer tUPA1 (indicative of the actual preparation-completion time T1) has reached 0. When the result is negative, since this indicates the time has not elapsed, the program proceeds to S106. On the other hand, when the result is affirmative, the program proceeds to S118 in which the value of SFTMON is rewritten as 20h. The program then proceeds to S120 in which a torque-phase ON/OFF torque calculation is conducted.

Figure 21:
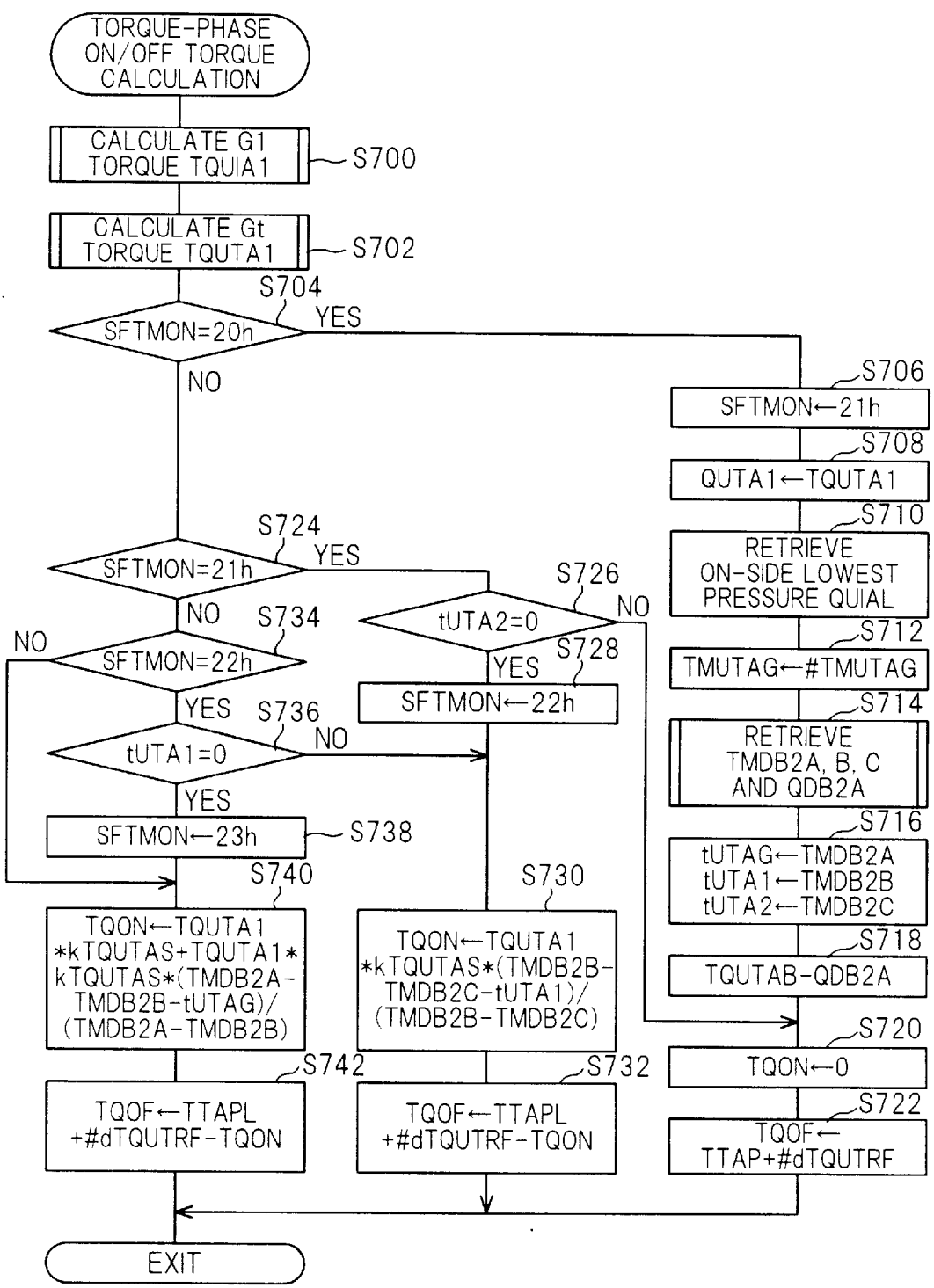
FIG. 21 is a flow chart showing the subroutine of calculating a torque-phase ON/OFF torques referred to in the flow chart of FIG. 3.

FIG. 21 is a flow chart showing the subroutine for the calculation.

Before entering the explanation, the calculation will be briefed.

As mentioned above, Japanese Laid-Open Patent Application No. Hei 6 (1994)-341525 teaches detecting over-revving of the engine and tie-up of the frictional engaging element such as a hydraulic clutch and when it is detected that the engine revs over or excessively, changing the characteristics of control to raise the pressure of the clutch to be engaged, to make the slope steep in the wave-form of supplied pressure or to quicken the timing to raise the pressure, thereby suppressing the shift shock due to over-revving of the engine or clutch tie-up.

Since, however, the performance of tracking or follow-up of hydraulic pressure is not taken into account in this prior art, the engine may rev over when the engine torque is increased. In other words, the control toughness against the engine speed is not satisfactory in the prior art.

In the embodiment, the system is configured to determine the pressure supply taking the performance of tracking or follow-up of the hydraulic pressure into account. More specifically, it determines a time to track or follow-up the pressure rise of the clutch to be engaged (ON-side) after completion of preparation and the characteristic of torque resulting in therefrom, based on data stored in a memory of the ROM 84 (or RAM 86) of the ECU 80. Here, the tracking or follow-up time indicates a period of time until the actual hydraulic pressure reaches a command value since the beginning of the torque rise.

With this, the system can recognize from when and how the ON-side clutch generates the torque, and based on the recognized torque and the estimated input torque (engine torque), it can calculate the pressure necessary for the OFF-side clutch. Saying this simply, the system is configured to determine the OFF-side value such that it balances with the input to the ON-side.

Figure 22:
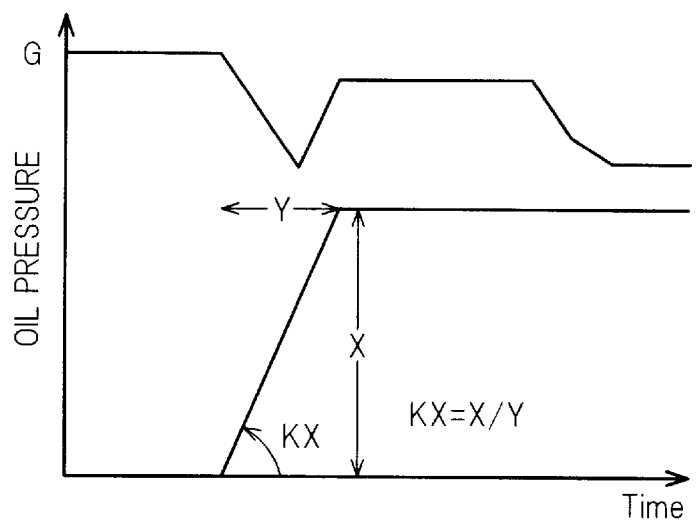
FIG. 22 is an explanatory time chart showing the operation of the flow chart of FIG. 21 and illustrating a reference value of the manipulated variable and a desired time in the inertia-phase in upshifting.

Specifically, in the upshift control, the pressure to be supplied in the inertia-phase is normally determined in order to decrease the shift shock. In the system, if defining a reference value of the desired manipulated variable (indicative of the pressure to be supplied) by X, the system is configured to determine a transient value of the manipulated variable in the following such that the actual clutch (hydraulic) pressure becomes equal to that determined by the reference desired manipulated variable X within a predetermined desired time Y, as illustrated in FIG. 22.

Figure 23:
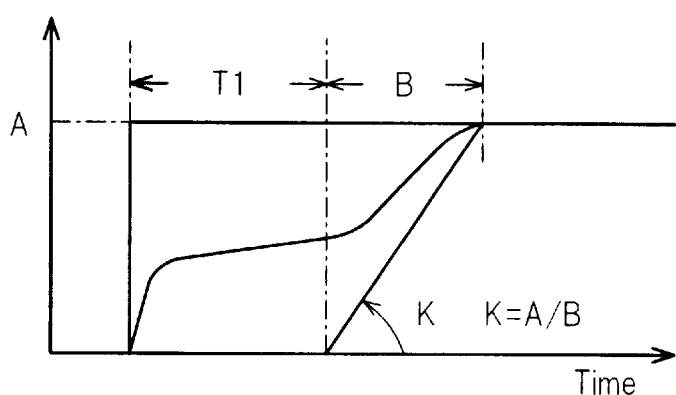
FIG. 23 is an explanatory time chart showing a tracking or follow-up time on the assumption that constant manipulated variable (pressure) A is applied in the processing illustrated in FIG. 22.

More specifically, as illustrated in FIG. 23, a tracking or follow-up time B is obtained beforehand through experimentation, on the assumption that constant (hydraulic) pressure (manipulated variable A) is applied and is stored in the memory as a slope K (=A/B). The manipulated variable A comprises a plurality of values selected from those that actually used in the shift control and is stored as mapped data (first data) X1(n) to be retrieved by the input shaft rotational speed NM and the ATF temperature TATF.

Figure 24:
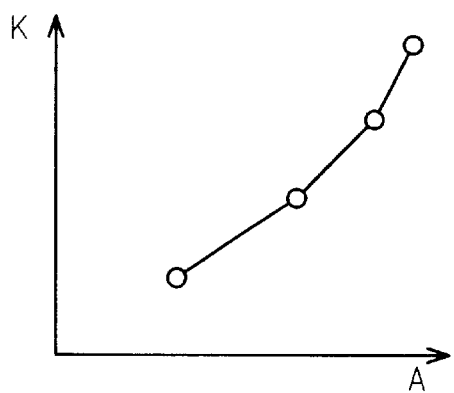
FIG. 24 is an explanatory graph showing the response of the manipulated variable in the characteristics illustrated in FIG. 23.

Moreover, as illustrated in FIG. 24, the slope K is also stored as mapped data (second data). The slope K can indicate a control response of the manipulated variable A which realizes the actual pressure reaching the command value within a certain period of time when outputted.

Figure 25A:
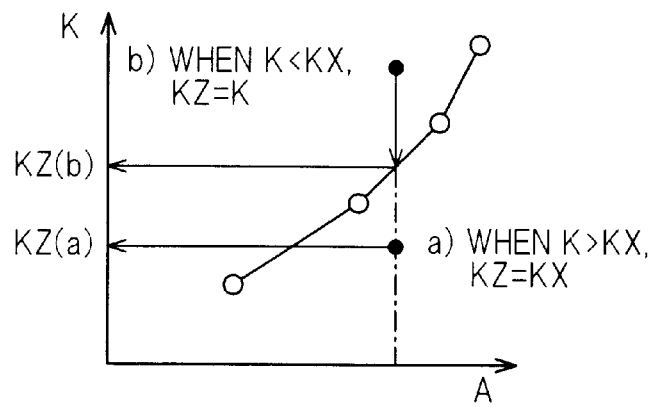
FIG. 25 is a set of explanatory graphs showing comparison result of the response of the manipulated variable illustrated in FIG. 24.
Figure 25B:
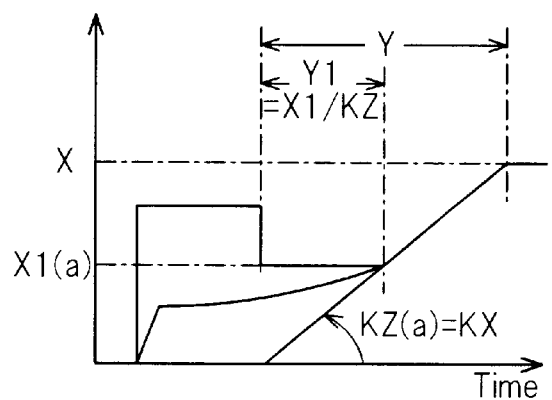

Then, the ratio between the values X and Y (=X/Y; hereinafter referred to as "KX") is determined. Then, defining the ratio KX as a desired value, the ratio KX is compared with K (the second data indicative of the response of A), as illustrated in FIG. 25A. When K>KX, since this indicates that the stored data is greater, in other words, since this indicates that it is possible to reach the reference desired manipulated variable X within the desired time Y, the desired value KX is determined to be the slope to be executed (determined value; hereinafter referred to as "KZ"), as illustrated in FIG. 25B.

Figure 25C:
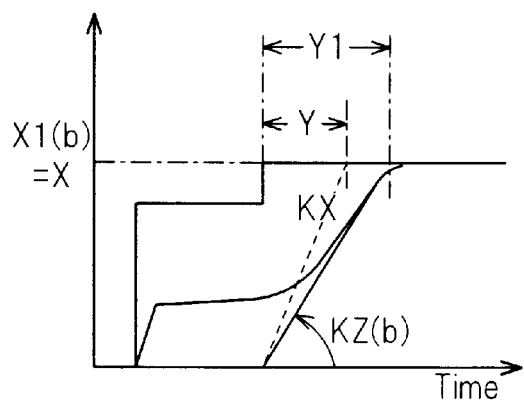

On the other hand, when K<KX, since this indicates that the desired slope is greater, in other words, since this indicates that it is not possible to reach the reference desired manipulated variable X within the desired time Y, the time is extended to Y1 and the mapped data K is determined to be the slope (to be executed) KZ, as illustrated in FIG. 25C.

Figure 26:
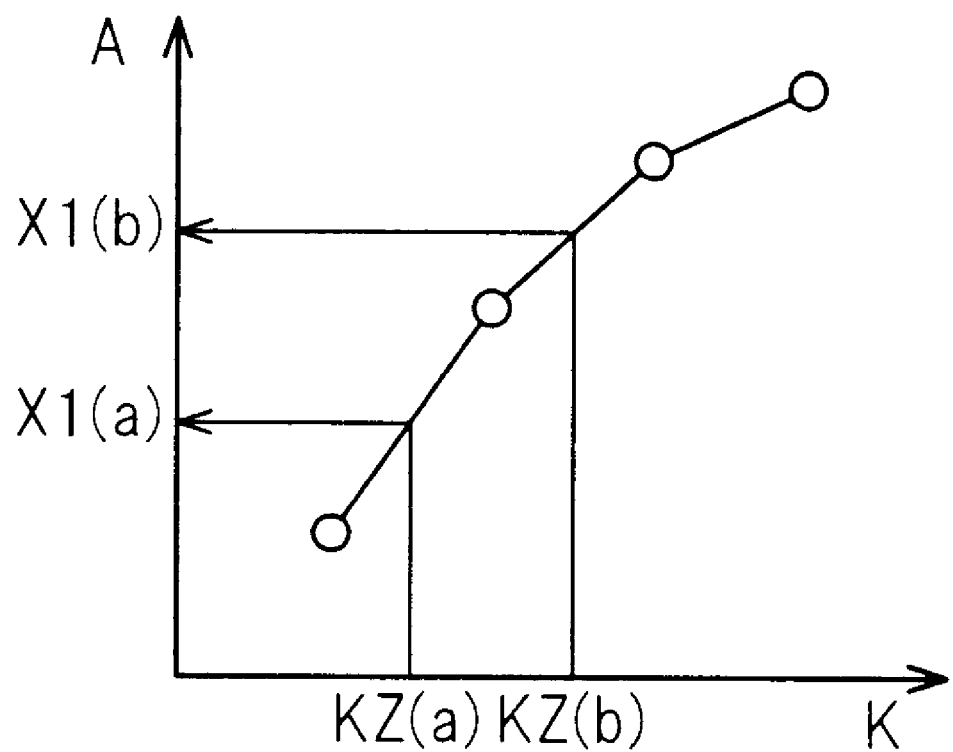
FIG. 26 is an explanatory graph showing a characteristic of a transient manipulate obtained by retrieving the manipulated variable illustrated in FIG. 24 by the response.

Then, the manipulated variable A is determined by retrieving the mapped data (second data) illustrated in FIG. 26. More concretely, the manipulated variable X1(n) is retrieved from the mapped data using the determined slope KZ as address datum. When K<KX, since it is not necessary to continuously output the reference desired manipulated variable X during the desired period of time, the value X1 becomes less than the value X. On the other hand, when K>KX, the values X and X1 become close to each other.

With respect to the desired time, the time Y1 is determined as Y1=X/KZ. When KZ=KX, Y=Y1. When KZ<KX, as illustrated in FIG. 25C, Y1=(X/KZ)>Y. This indicates that, when it is impossible to complete within the desired time, the execution time is automatically extended based on the eigenvalue of the mechanic system in the prepared data.

On the other hand, when KZ>KX, as illustrated in FIG. 25B, X1 is outputted as a transient pressure (manipulated variable) so as to bring the pressure to the desired value just within the desired time, the time Y1 for outputting X1 can be determined as Y1=X1/KZ.

Based on the above, the calculation of the torque-phase ON/OFF torques will be explained with reference to the flow chart of FIG. 21.

The program begins in S700 in which a G1 torque TQUIA1 is calculated. The G1 torque indicates a desired torque at the beginning of the inertia-phase and is calculated based on a desired value of the acceleration of gravity (hereinafter referred to as "G") in the linear direction. G2 torque and G3 torque explained later are similar desired torques at the midpoint and terminal point of the inertia-phase.

Figure 27:
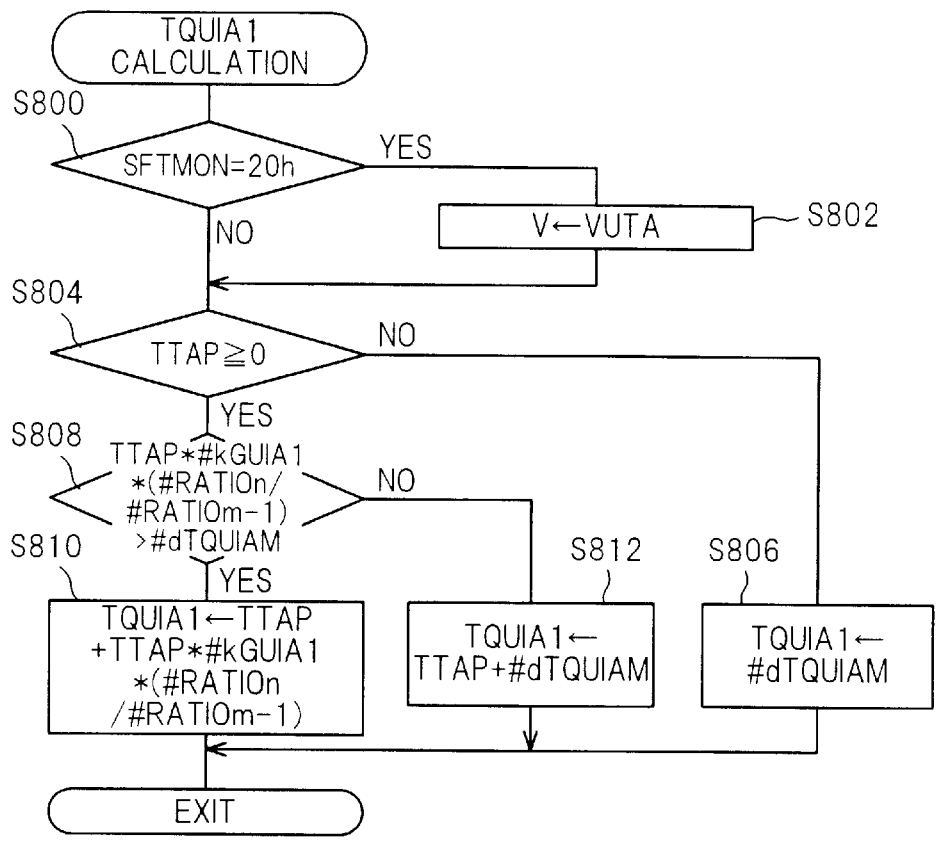
FIG. 27 is a flow chart showing the subroutine of calculating a G1 torque TQUIA referred to in the flow chart of FIG. 21.

FIG. 27 is a flow chart showing the subroutine for the calculation.

The program begins in S800 in which it is determined whether the value of SFTMON is 20h. Since it was set to 20h in S118 in the flow chart of FIG. 3, the result is naturally affirmative and the program proceeds to S802 in which the detected vehicle speed V is fixed and the fixed value is named a predetermined vehicle speed VUTA such that the same vehicle speed should be used in calculating the G2 torque and the G3 torque.

The program then proceeds to S804 in which it is determined whether the estimated input torque (engine torque) TTAP is greater or equal to 0. When the result is negative, the program proceeds to S806 in which the G1 torque TQUIA1 is determined to be a predetermined value #dTQUIAM (value indicative of the available torque such as 3 kgf·m).

When the result in S804 is affirmative, the program proceeds to S808 in which it is determined whether a product obtained by multiplying the estimated input torque TTAP by a ratio or correction coefficient #kGUIA1 (obtained by the predetermined (fixed) vehicle speed VUTA and the throttle opening) and by a difference (between the gear ratio (#RATIOn/#RATIOm) and 1.0), is greater than the predetermined value #dTQUIAM.

When the result in S808 is negative, the program proceeds to S812 in which a sum (obtained by adding the predetermined value #dTQUIAM is added to the estimated input toque TTAP) is determined to be the G1 torque TQUIA1. When the result in S808 is affirmative, the program proceeds to S810 in which the G1 torque TQUIA1 is calculated as follows:

$$TQUIA1=TTAP*\{1+\#kGUIA1*((\#RATIOn/\#RATIOm)-1)\}$$

The G1 torque and the ratio (correction coefficient #kGUIA1 will later be referred to. In the above equation and other equations, the symbol "*" indicates multiplication.

Returning to the explanation of the flow chart of FIG. 21, the program proceeds to S702 in which a Gt torque TQUTA1 is calculated. The Gt torque TQUTA1 indicates a desired torque at the terminal point of the torque phase.

Figure 28:
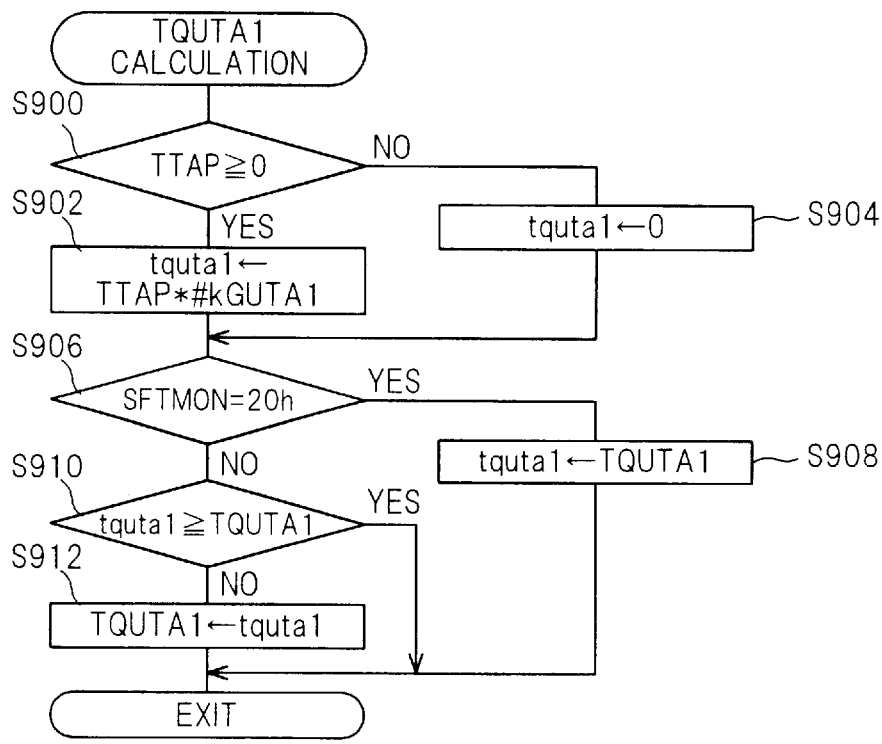
FIG. 28 is a flow chart showing the subroutine of calculating a Gt torque TQUTA1 referred to in the flow chart of FIG. 21.

FIG. 28 is a flow chart showing the subroutine of the calculation.

The program begins in S900 in which it is determined whether the estimated input torque TTAP is greater or equal to 0, and if the result is affirmative, the program proceeds to S902 in which the estimated input torque TTAP is multiplied by a predetermined value #kGUTA1 and the product is determined to be a desired torque tquta1. When the result in S900 is negative, the program proceeds to S904 in which the desired torque tqutal is determined to be 0.

The program then proceeds to S906 in which it is determined whether the value of SFTMON is 20h. When the result is affirmative, since this indicates that the current program loop is for the first time in the torque-phase, the program proceeds to S908 in which the Gt torque TQUTA1 is determined to be the desired torque tqutal.

On the other hand, when the result in S906 is negative, the program proceeds to S910 in which it is determined whether the desired torque tqutal is greater or equal to the Gt torque TQUTA1. When the result is affirmative, since this the value is greater or equal to the preceding value, the program is immediately terminated so as not to update the value. When the result is negative, the program proceeds to S912 in which the desired torque tqutal is determined to be the Gt torque TQUTA1.

Figure 29A:
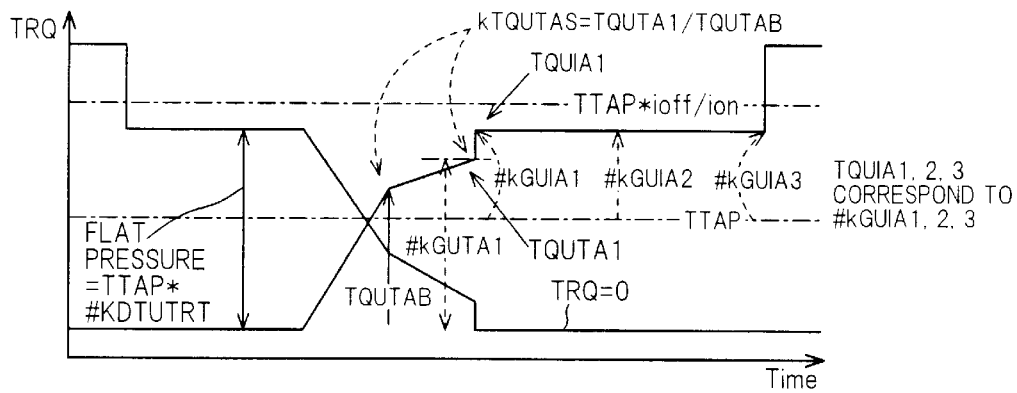
FIG. 29 is a set of explanatory time charts showing parameters and variables referred to in the flow charts of FIGS. 27 and 28.
Figure 29B:
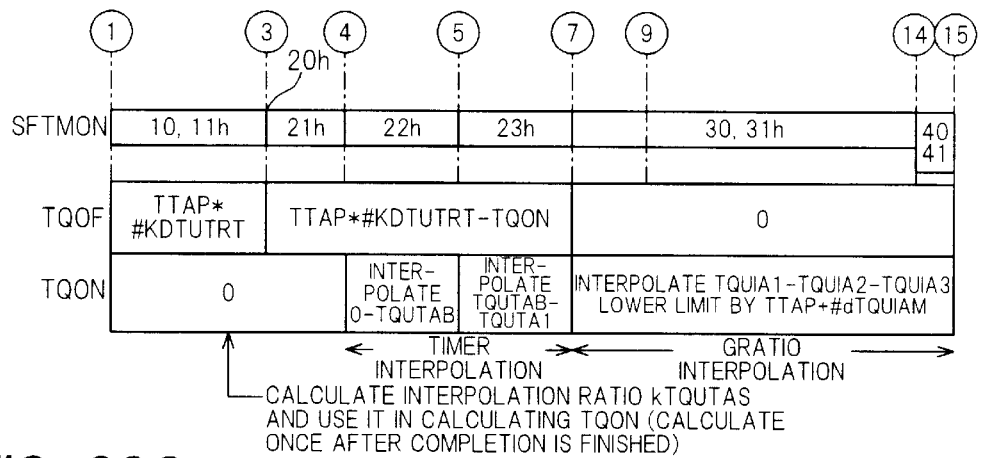
Figure 29C:
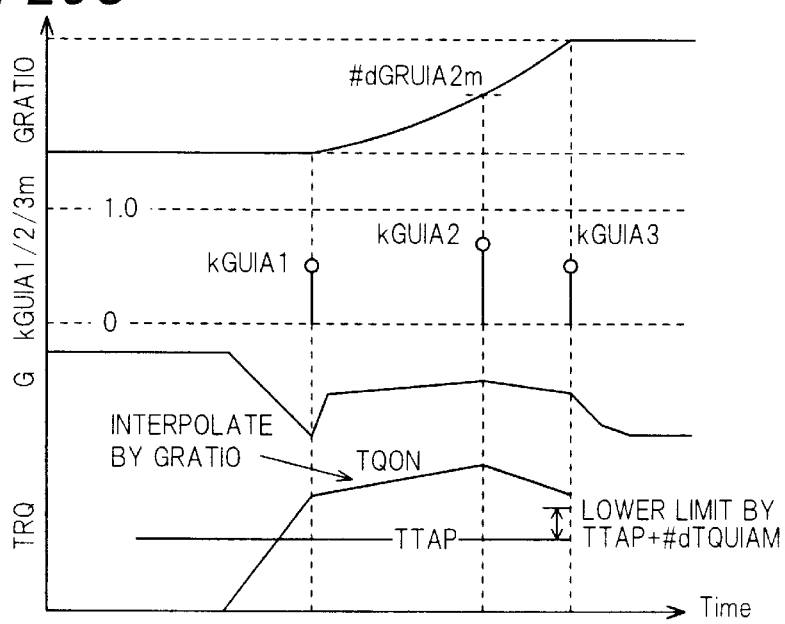

FIGS. 29A, 29B and 29C illustrate the parameters and variables used in the flow charts of FIG. 27 and 28.

Returning to the flow chart of FIG. 21, the program proceeds to S704 in which it is determined whether the value of SFTMON is 20h, in other words, it is determined whether the program loop is for the first time in the torque-phase. When the result is affirmative, the program proceeds to S706 in which the value of SFTMON is set to 21h and to S708 in which the Gt torque TQUTA1 is converted into a pressure value named Gt pressure QUTA1.

The program then proceeds to S710 in which a minimum pressure QUIAL for the clutch to be engaged (ON-side). The program then proceeds to S712 in which a predetermined value #TMUTAG is retrieved which is determined to be a torque-phase desired time TMUTAG. The program then proceeds to S714 in which various values including a torque-phase control time for the ON-side clutch in upshift named TMDB2A (the tracking or follow-up time to the desired value), a torque-phase boost pressure QDB2A (corresponding to X1(a) in FIG. 25B) and a boost control time TMDB2B (corresponding to Y in FIG. 25B) are calculated.

Figure 30:
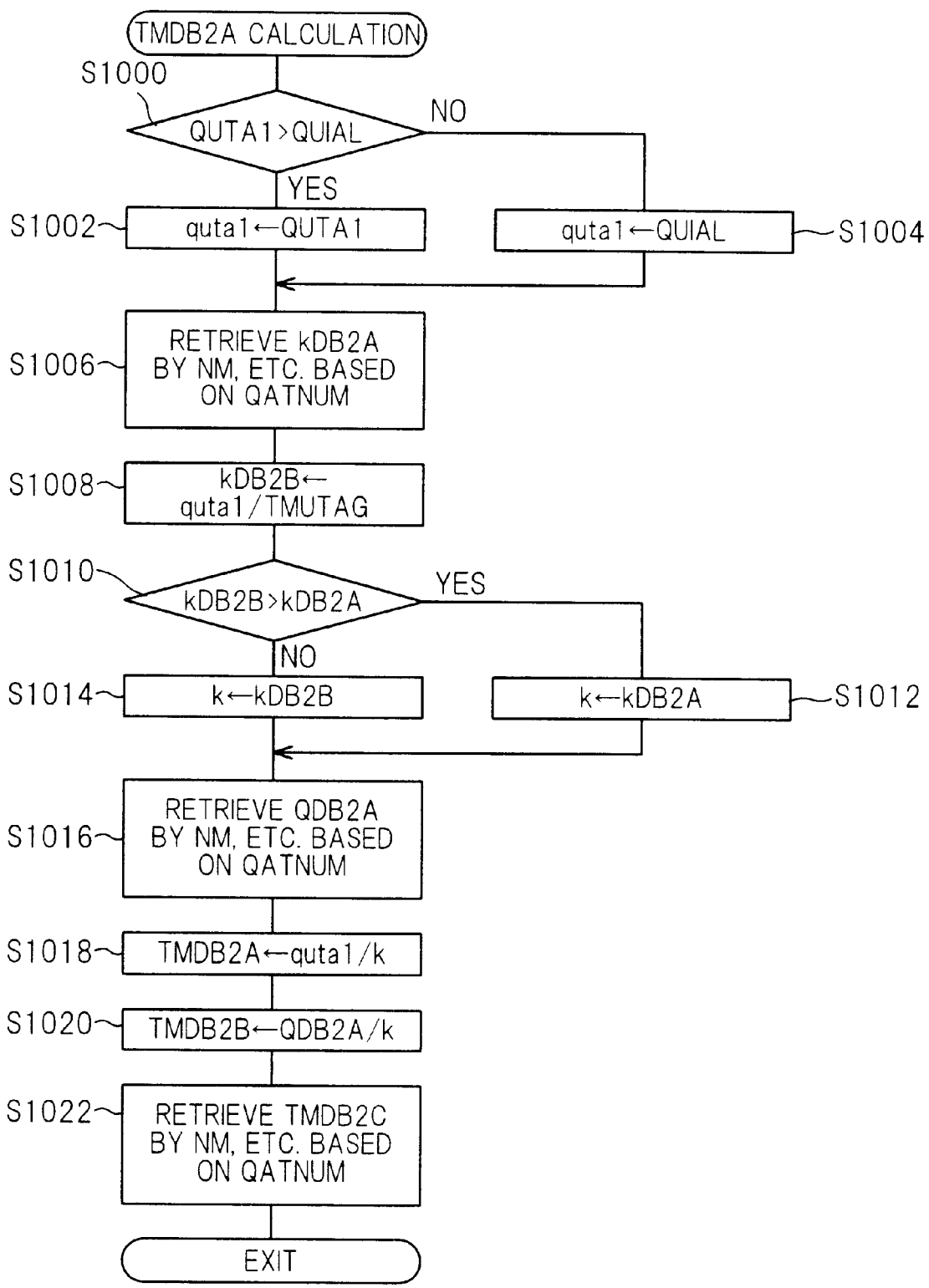
FIG. 30 is a flow chart showing the subroutine of calculating times including a torque-phase control time TIMDB2A referred to in the flow chart of FIG. 21.

FIG. 30 is a flow chart showing the subroutine for the calculation and FIGS. 31 and 32 are time charts showing the torque-phase time TMDB2A, etc.

The program begins in S1000 in which it is determined whether the Gt pressure QUTA1 is greater than the ON-side minimum value QUIAL, and when the result is affirmative, the program proceeds to S1002 in which a reached-pressure qutal (corresponding to X mentioned with reference to FIG. 22) is determined to be the Gt pressure QUTA1. When the result in S1000 is negative, the program proceeds to S1004 in which the reached-pressure qutal is determined to be the minimum pressure QUIAL.

Figure 32A:
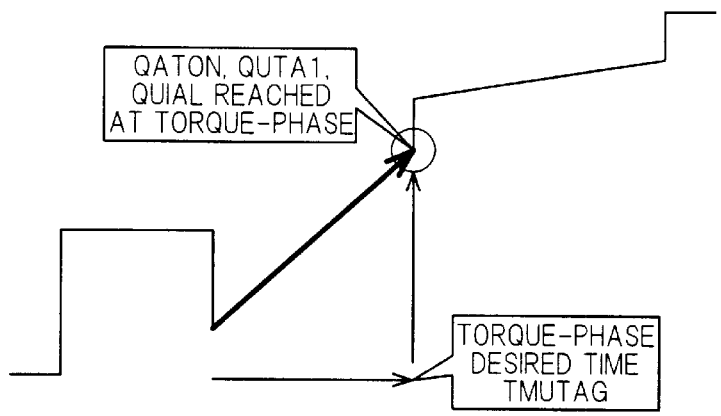
FIG. 32 is a set of explanatory time charts similarly showing the calculation of the times including the torque-phase control time TMDB2A referred to in the flow chart of FIG. 21.
Figure 32B:
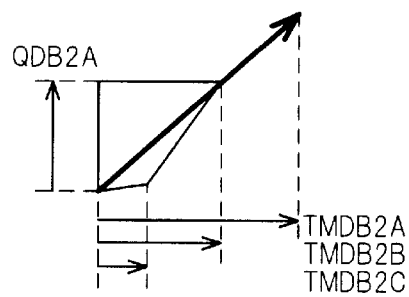
Figure 32C:
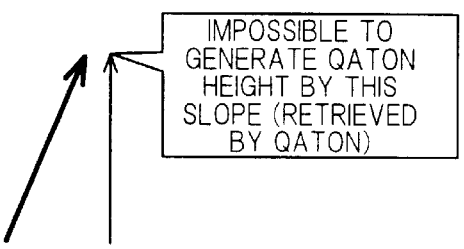
Figure 32D:
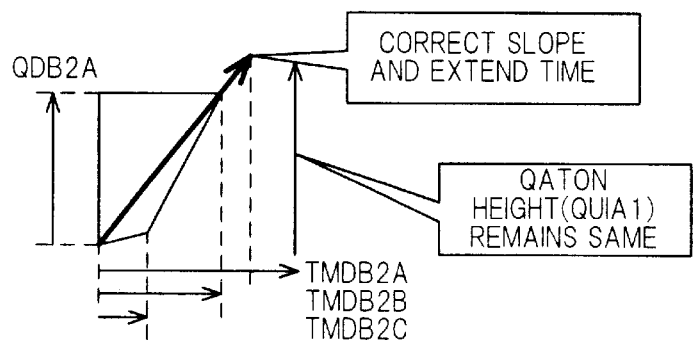

The program then proceeds to S1006 in which a torque-phase maximum (steepest) slope kDB2A (corresponding to the aforesaid K mentioned with reference to FIG. 25A) is retrieved from mapped data based on the shift mode QATNUM using the detected input shaft rotational speed NM, the reached-pressure qutal and the ATF temperature TATF as address data. The program then proceeds to S1008 in which the reached-pressure qutal is divided by the aforesaid value TMUTAG (torque-phase desired time (desired reaching time); corresponding to the aforesaid Y mentioned with reference to FIG. 22) and the obtained quotient is determined to be a torque-phase slope kDB2B (corresponding to the aforesaid KX described with reference to FIG. 25A). FIG. 32A illustrates the torque-phase desired time TMUTAG, etc.

The program then proceeds to S1010 in which it is determined whether the determined torque-phase slope kDB2B is greater than the torque-phase maximum slope kDB2A. When the result is affirmative, since this indicates that the torque-phase time is extended and the program proceeds to S1012 in which the torque-phase maximum slope kDB2A is determined to be a slope k. On the other hand, when the result is negative, the program proceeds to S1014 in which the torque-phase maximum slope kDB2B is determined to be the slope k.

The program then proceeds to S1016 in which the boost pressure QDB2A is retrieved from mapped data based on the shift mode QATNUM using the detected input shaft rotational speed NM, the slope k and the ATF temperature TATF as address data. The program then proceeds to S1018 in which the reached-pressure qutal is divided by the slope k and the obtained quotient is determined to be the torque-phase control time TMDB2A.

The program then proceeds to S1020 in which the boost pressure QDB2A is divided by the slope k and the obtained quotient is determined to be the boost control time TMDB2B. The program then proceeds to S1022 in which a break time TMDB2C is retrieved from mapped data based on the shift mode QATNUM using the detected input shaft rotational speed NM, the boost pressure QDB2A and the ATF temperature TATF as address data.

Returning to the explanation of the flow chart of FIG. 21, the program proceeds to S716 in which the calculated torque-phase control time TMDB2A, the boost control time TMDB2B and the break time TMDB2C are respectively set on timers tUTAG, tUTA1 and tUTA2 to start time measurement. The program then proceeds to S718 in which the calculated boost pressure QDB2A is converted into a torque value TQUTAB in an appropriate manner.

The program the proceeds to S720 in which the ON-side desired clutch torque TQON is made 0, to S722 in which an available additive torque value #dTQUTRF is added to the estimated input torque TTAP and the sum is determined to be the OFF-side desired clutch torque TQOF.

Figure 31A:
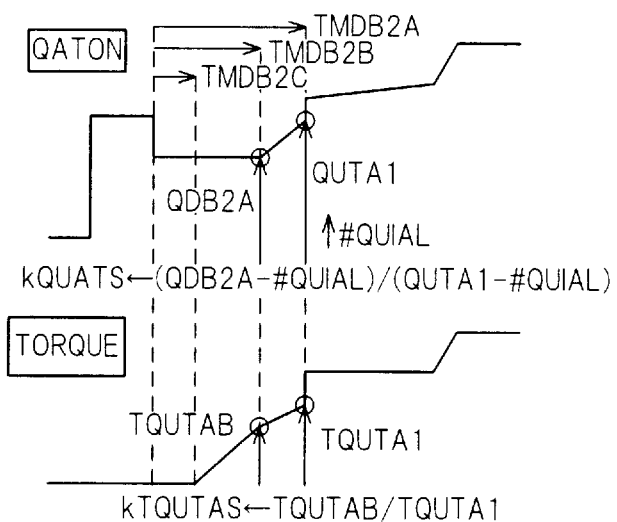
FIG. 31 is a set of explanatory time charts showing the calculation of the times including the torque-phase control time TMDB2A referred to in the flow chart of FIG. 21.

On the other hand, when the result in S704 is negative, the program proceeds to S724 in which it is determined whether the value of SFTMON is 21h. When the result is affirmative, the program proceeds to S726 in which it is determined whether the value of the timer tUTA2 (set with TMDB2C) is 0 and if the result is negative, since this indicates that it is before the break, as shown in FIG. 31A, the program proceeds to S720.

Figure 31B:
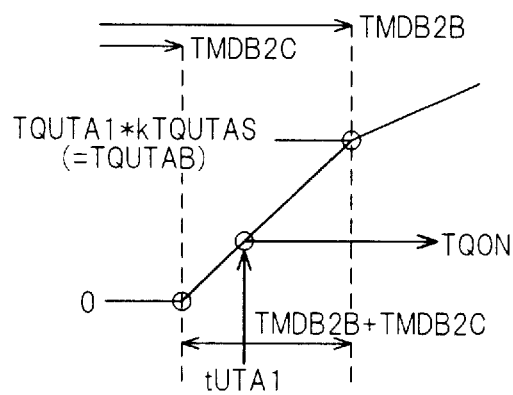

When the result in S726 is affirmative, the program proceeds to S728 in which the value of SFTMON is set to 22h, and proceeds to S730 in which the ON-side desired clutch torque TQON is calculated by interpolating TQUTA1, etc., as shown there and in FIG. 31B. The program then proceeds to S732 in which the ON-side desired clutch torque TQON is subtracted from the values shown there and the difference is determined to be the OFF-side desired clutch torque TQOF.

When the result in S724 is negative, the program proceeds to S734 in which it is determined whether the value of SFTMON is 22h. When the result is affirmative, the program proceeds to S736 in which it is determined whether the value of the timer tUTA1 is 0. When the result is negative, the program proceeds to S730. When the result is affirmative, the program proceeds to S738 in which the value of SFT-MON is set to 23h. When the result in S734 is negative, the program proceeds to S740.

Figure 31C:
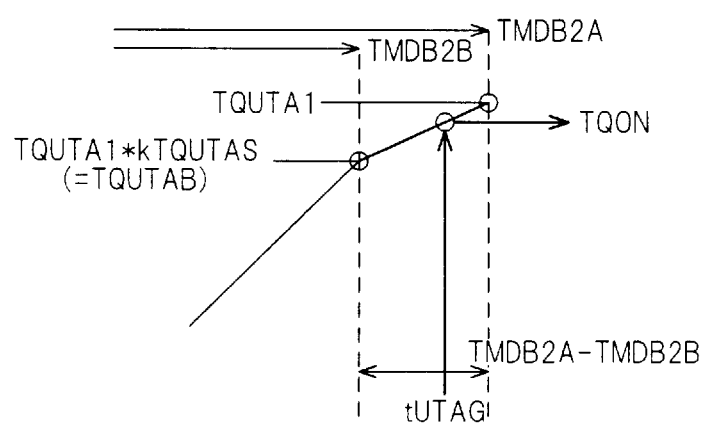

The program then proceeds to S740 in which the ON-side desired clutch torque TQON is calculated by interpolating a portion between TQUTAB and TQUTA1 as shown there and in FIG. 31C, and proceeds to S742 in which the OFF-side desired clutch torque TQOF is calculated in the manner as shown and similar to that mentioned in S732.

Having been configured in the foregoing manner, the system according to the embodiment can effect the control taking the tracking or follow-up of hydraulic pressure into account and can track or follow up the change of the estimated input torque, without causing the engine to rev over or excessively. Moreover, it can shorten the torque-phase control time and realize an improved control which can effectively suppress the shift shock.

Specifically, a reached-pressure (quta1, A) is determined based on at least the calculated input torque; a maximum value (kDB2A, KX (=X/Y)) in pressure control response is determined which set with respect to a desired reaching time (TMUTAG, Y) in accordance with a predetermined characteristic, based on at least the detected input shaft rotational speed and the determined reached-pressure; and an actual value (kDB2B, K (=A/B)) in the pressure control response is determined based on at least the determined reached-pressure relative to the desired reaching time; and the determined maximum value and the determined actual value are compared to determine the pressure control response and for determining a desired value (TQON) to be supplied to one of the frictional engaging elements (Cn) of the target gear to be shift to, based on the determined pressure control response. And the desired value based on the determined maximum value is determined when the determined actual value is greater than the determined maximum value (80, S20, S120, S714, S1010, S1012, S740)., or the desired value is determined based on the determined actual value when the determined actual value is less than the determined maximum value (80, S20, S714, S1010, S1014, S730).

Returning to the explanation of the flow chart of FIG. 3, the program proceeds to S122 in which the ON-side torque-phase pressure is calculated or determined as the ON-side clutch pressure QATON, and to S124 in which the OFF-side torque-phase pressure is calculated or determined as the OFF-side clutch pressure QATOF in the manner illustrated in FIG. 20.

When the result in S114 is negative, the program proceeds to S126 in which it is determined whether the value of SFTMON is 20h or 21h. When the result is affirmative, the program proceeds to S128 in which it is determined whether the value of the timer tUTAG is 0 and when the result is negative, the program proceeds to S120. When the result in S128 is affirmative, the program proceeds to S130 in which the value of SFTMON is set to 30h.

Here, the calculation or estimation of the engine torque (estimated input torque) will be explained.

Conventionally, as taught in Japanese Laid-Open Patent Application No. Hei 6 (1994)-207660, the engine toque is estimated based on the vehicle speed and the throttle opening. Alternatively, it is estimated from information including the engine speed and manifold absolute pressure or from the state of the torque converter, etc.

However, when the engine torque is estimated from the throttle opening, etc., the estimation is likely to be affected by the change in environment. When it is estimated from the manifold absolute pressure, etc., since factors of the torque converter and inertia energy are not taken into account, the estimation accuracy is not always satisfactory. Further, when it is estimated from the state of the torque converter, since the toque absorption characteristic of the torque converter changes suddenly when fully-locked up or thereabout, the estimation accuracy is liable to be degraded particularly in a transient state.

Figure 33:
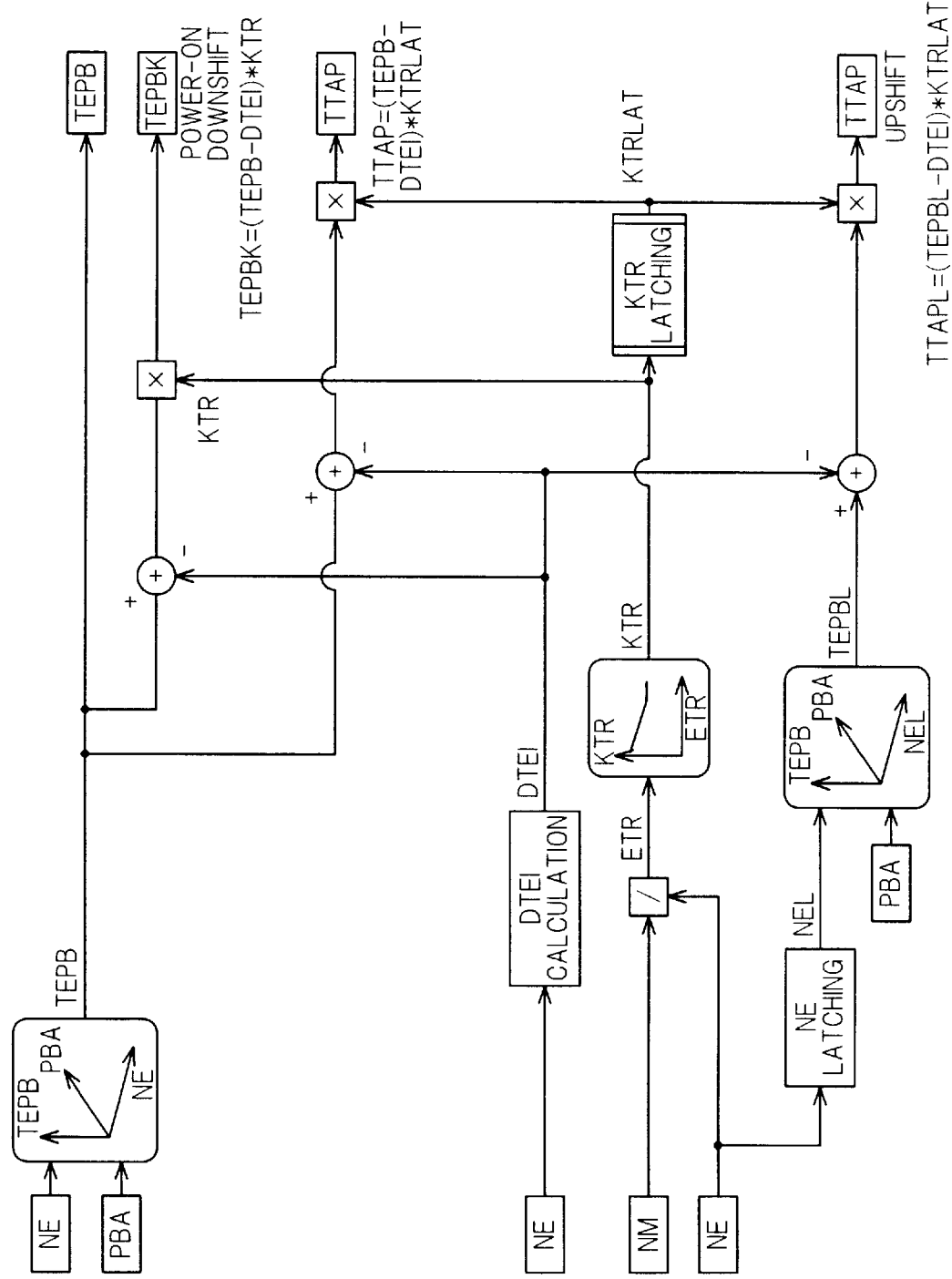
FIG. 33 is a block diagram showing the calculation of the engine torque TTAP referred to in the flow chart of FIG. 21.

In view of the above, as illustrated in FIG. 33, based on mapped data of the engine torque TEPB retrievable by the engine speed NE and the manifold absolute pressure PBA, the system according to the embodiment calculate a value indicative of inertia torque DTEI used for raising the engine speed NE therefor, and calculates or estimates the input torque TTAP using the calculated the value DTEI and a torque converter torque ratio KTR.

Specifically, the input torque TTAP is calculated as follows:

$$TTAP=(TEPB-DTEI)*KTRLAT$$

The value DTEI is set to zero if a torque converter slip ratio ETR is greater than 1.0, in other words, if it is driven by the vehicle wheels. The value DTEI is smoothed to be prepared for the use in the upshift. Moreover, if a shift starts when the upshift is in progress, the engine speed NE drops and the value DTEI becomes negative. However, since the engine torque remains unchanged, the system is configured not to calculate the inertia torque when the shift is in progress. In other words, the value DTEI is fixed upon entering the inertia-phase control.

Figure 34:
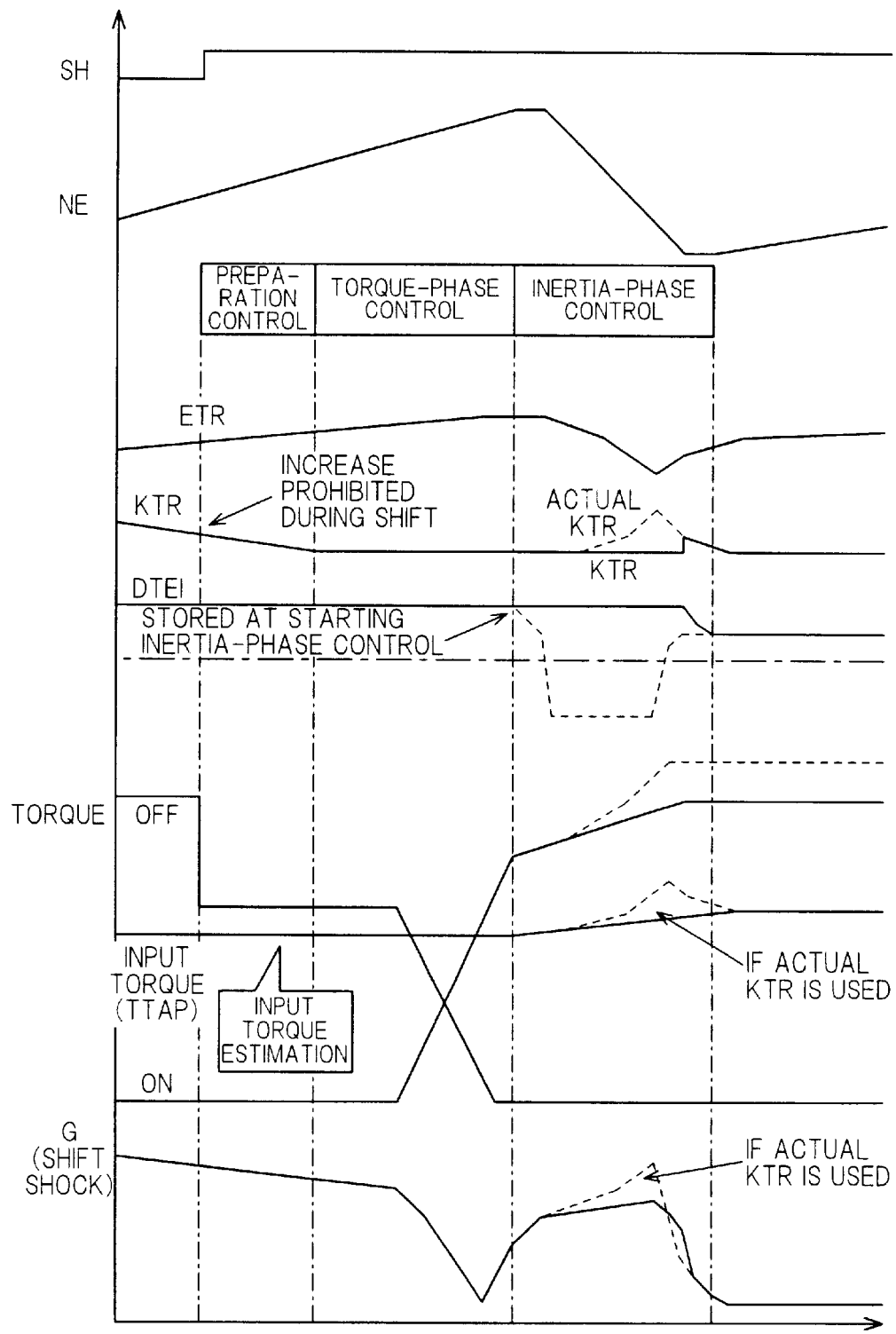
FIG. 34 is a time chart similarly showing the calculation of the engine torque TTAP referred to in the flow chart of FIG. 21.

As regards the torque converter torque ratio KTR, as shown in a time chart of FIG. 34, in case that the actual KTR is used when the shift is in progress, if the actual KTR increases, the input torque TTAP increase. As a result, since the control pressure is increased, the shift shock becomes greater. In view of this, the system is configured not to increase KTR when the shift is in progress (i.e., to change only in a direction in which the KTR decreases), thereby enhancing the tracking or follow-up performance towards a desired G in the inertia-phase control (explained later).

Based on the above, the calculation of the estimated input torque (engine torque) TTAP will be explained with reference to a flow chart of FIG. 35.

The program begins in S1100 in which the aforesaid engine torque TEPB is retrieved from the mapped data using the detected engine speed NE and the absolute manifold pressure PBA as address data, and proceeds to S1102 in which the value DTEI is calculated.

Figure 36:
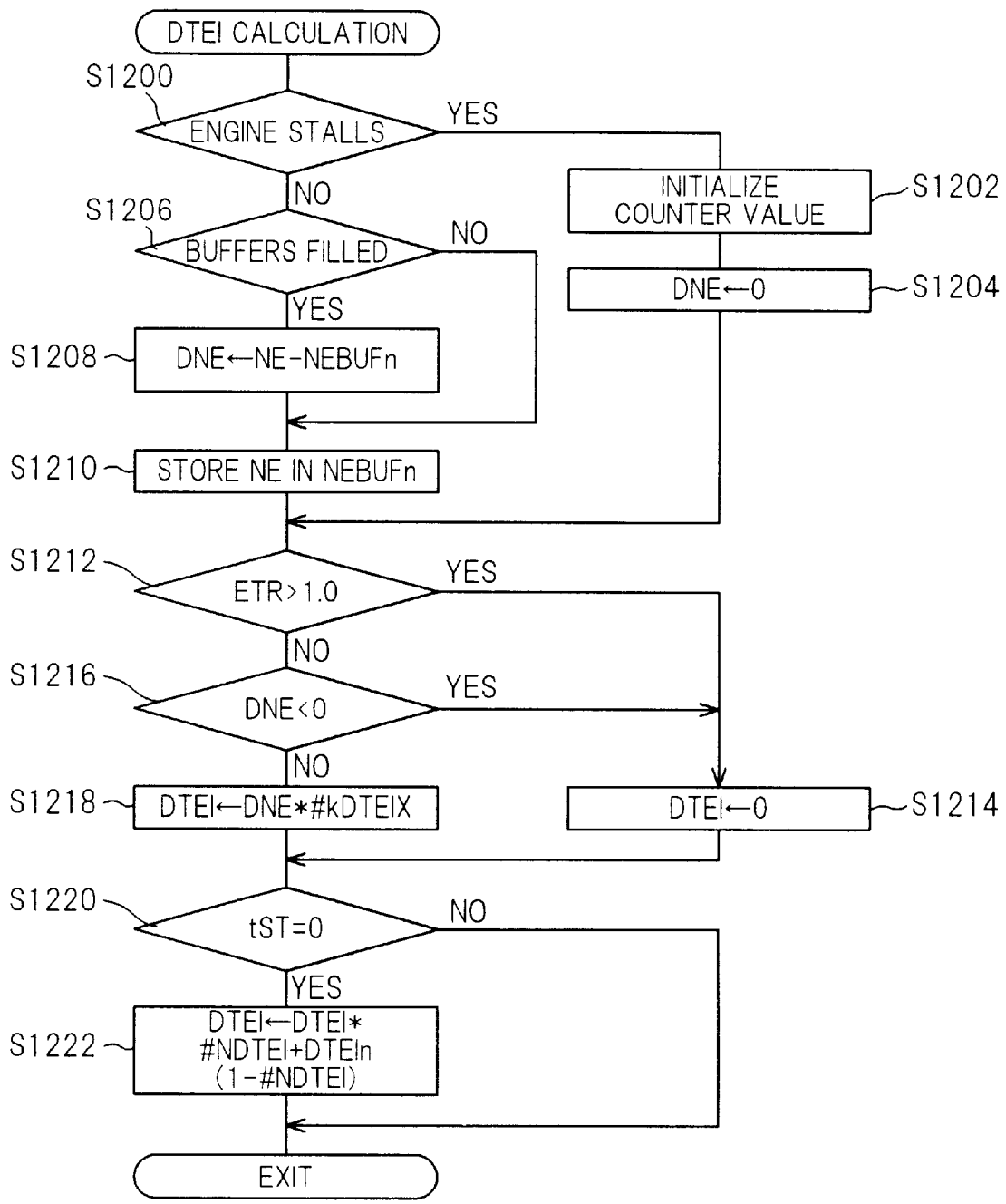
FIG. 36 is a flow chart showing the subroutine of calculating a value DTEI referred to in the flow chart of FIG. 35.

FIG. 36 is a flow chart showing the subroutine for the calculation.

The program begins in S1200 in which it is determined whether the engine E stalls by an appropriate manner and when the result is affirmative, the program proceeds to S1202 in which a counter is initialized. The counter has ten ring buffers which store the detected engine speed NE successively each time the program is looped (at every 10 msec). The program then proceeds to S1204 in which an engine speed change amount DNE (explained later) is reset to 0.

When the result in S1200 is negative, the program proceeds to S1206 in which it is determined whether the ten ring buffers of the counter are filled with the engine speed data and when the result is affirmative, the program proceeds to S1208 in which an engine speed NEBUFn (detected and stored in any of the buffer at 100 msec earlier) is subtracted from the engine speed NE (detected in the current program loop) to determine the difference therebetween as the engine speed change amount DNE. When the result in S1206 is negative, the program skips S1208.

The program then proceeds to S1210 in which the engine speed NE (detected in the current program loop) is stored in any of buffer and to S1212 in which the torque converter slip ratio ETR is calculated by obtaining a ratio between the detected engine speed NE and the input shaft rotation speed NM and it is determined whether the ratio is greater than 1.0.

When the result in S1212 is affirmative, the program proceeds to S1214 in which the value DTEI is reset to 0. when the result is negative, on the other hand, the program proceeds to S1216 in which it is determined whether the calculated engine speed change amount DNE is less than 0. When the result in S1216 is affirmative, the program proceeds to S1214. When the result is negative, the program proceeds to S1218 in which a predetermined value #kDTEIX is multiplied by the engine speed change amount DNE to determine the value DTEI.

The program then proceeds to S1220 in which it is determined whether the value of a timer tST is 0. Since the value of the timer is reset to 0 when the shift is in progress in a routine (not shown), the processing in S1220 amounts for determining whether the shift is in progress. When the result in S1220 is negative, the program is immediately terminated, i.e., the value DTEI is held during shift. When the result is affirmative, the program proceeds to S1222 in which a weighted average between the current value and the preceding value is calculated using a weight coefficient #NDTEI to smooth or average the value DTEI.

Figure 35:
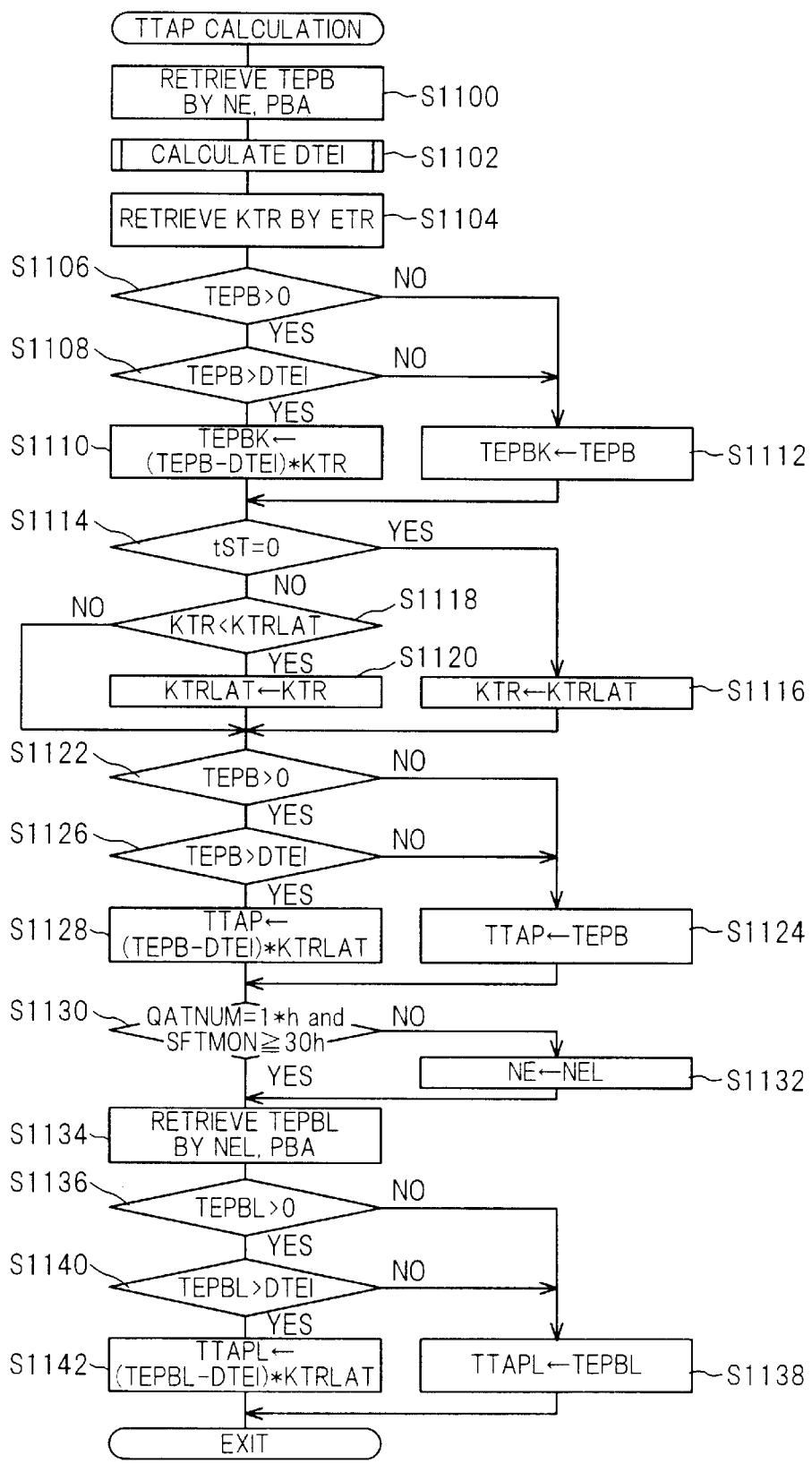
FIG. 35 is a flow chart showing the subroutine of calculating the engine torque TTAP referred to in the flow chart of FIG. 21.

Returning to the explanation of the flow chart of FIG. 35, the program proceeds to S1104 in which the torque converter torque ratio KTR is retrieved from a table using the calculated slip ratio ETR as address datum, as illustrated in FIG. 33. The program then proceeds to S1106 in which it is determined whether the retrieved engine torque TEPB is greater than 0.

When the result in S1106 is affirmative, the program proceeds to 1108 in which it is determined whether TEPB is greater than DTEI and if the result is affirmative, the program proceeds to S1110 in which DTEI is subtracted from TEPB and the obtained difference is multiplied by KTR. The product is named TEPBK. When the result in S1106 or S1108 is negative, the program proceeds to S1112 in which TEPB is renamed TEPBK. The value TEBPK is a value for calculating the engine torque in a power-on-downshift control.

The program then proceeds to S1114 in which it is determined whether the shift is in progress from the value of the timer tST and when the result is affirmative, the program proceeds to S1116 in which KTR is rewritten as KTRLAT. When the result is negative, the program proceeds to S1118 in which it is determined whether KTR is less than KTRLAT and when the result is affirmative, the program proceeds to S1120 in which KTR is rewritten as KTRLAT. When the result is negative, the program proceeds to S1122.

As illustrated in FIG. 33, these are for the calculation of the engine torque for the upshift control. Although KTR and TTAP are shown as KTRLAT and TTAPL in FIGS. 33 and 35, since the operation of the system is explained taking the upshift as an example, KTR is the same as KTRLAT and TTAP is the same as TTAPL.

The program then proceeds to S1122 in which it is determined whether TEPB is greater than 0 and when the result is affirmative, the program proceeds to S1126 in which it is determined whether TEPB is greater than DTEI. When the result is negative, the program proceeds to S1124. When the result is affirmative, the program proceeds to S1128 in which TTAP is calculated along the manner shown there.

The program then proceeds to S1130 in which it is determined whether the value of QATNUM is 1*h and the value of SFTMON is greater or equal to 30h. When the result is negative, since this indicates that it is under the torque-phase, the program proceeds to S1132 in which NE is rewritten as NEL and latched.

The program then proceeds to S1134 in which TEPBL is retrieve from mapped data using the latched engine speed NEL and the manifold absolute pressure PBA as address data, as illustrated in FIG. 33. The program then proceeds to S1136 in which it is determined whether the retrieved value TEPBL is greater than 0 and when the result is negative, the program proceeds to S1138 in which TEPBL is determined as TTAPL.

On the other hand, when the result in S1136 is affirmative, the program proceeds to S1140 in which it is determined whether TEBPL is greater than DTEI and when the result is negative, the program proceeds to S1138. When the result is affirmative, the program proceeds to S1142 in which TTAPL is calculated along the manner shown there.

Thus, as illustrated in FIG. 33, the engine speed NE for map retrieval is latched when entered the inertia-phase control in the upshift, the estimated input torque is calculated separately for the upshift and the downshift (particularly in the power-on downshift, i.e., the kick-down). As mentioned above, TTAPL and TTAP are equivalent.

Returning to the explanation of the flow chart of FIG. 3, the program proceeds to S132 in which the aforesaid G1 torque, G2 torque and G3 torque at the ON-side in the inertia-phase are calculated.

Figure 37:
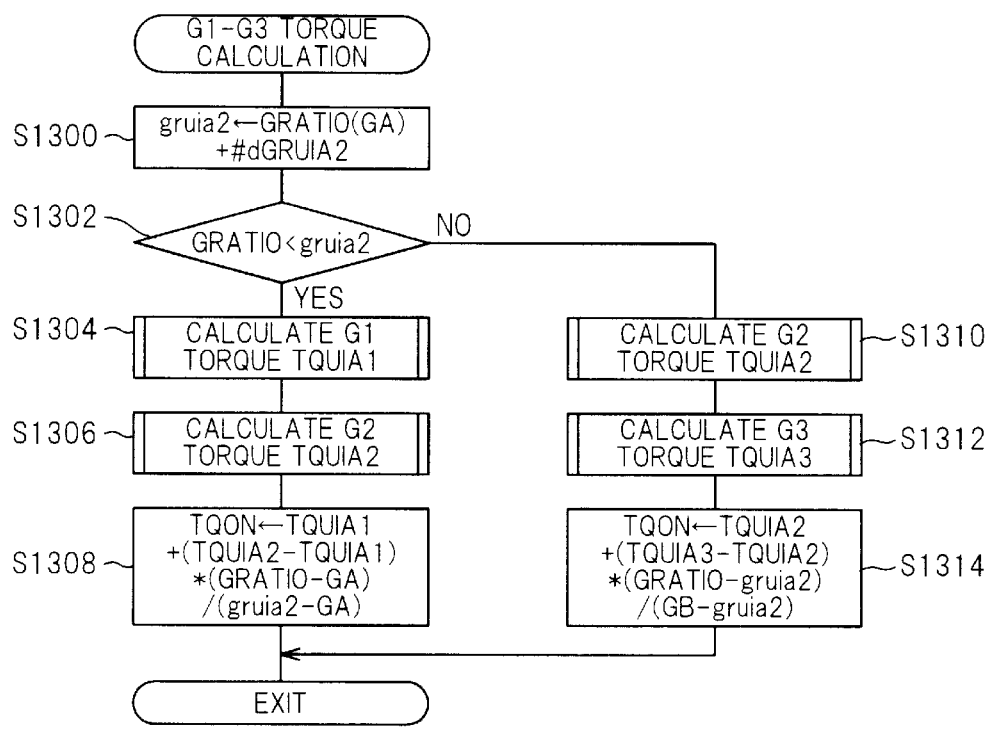
FIG. 37 is a flow chart showing the subroutine of calculating G1–G3 torques referred to in the flow chart of FIG. 3.

FIG. 37 is a flow chart showing the subroutine for the calculation.

Before entering the explanation, however, the calculation will be explained with reference to FIGS. 38 to 40.

As mentioned above, the prior art (Japanese Laid-Open Patent Application No. Hei 6 (1994)-207660) teaches increasing the hydraulic pressure in upshifting until the drive force becomes equal to that at the current gear now being engaged and is then kept for a predetermined period. However, since the drive force acting about the vehicle drive shaft is not the same as the acceleration of gravity G acting on the entire vehicle in the linear direction or in the direction of gravity. With this, by controlling drive force to that at the current gear, the shock of the entire vehicle, as a whole, may sometimes become greater contrary to what is expected.

Specifically, depending upon the vehicle operating conditions, the torque raised from a dropped level during the torque-phase may generate acceleration at the vehicle not only in the vehicle linear direction, but also in the direction of gravity (i.e. pitching), which generates an increased shock experienced by the vehicle occupant.

Figure 38:
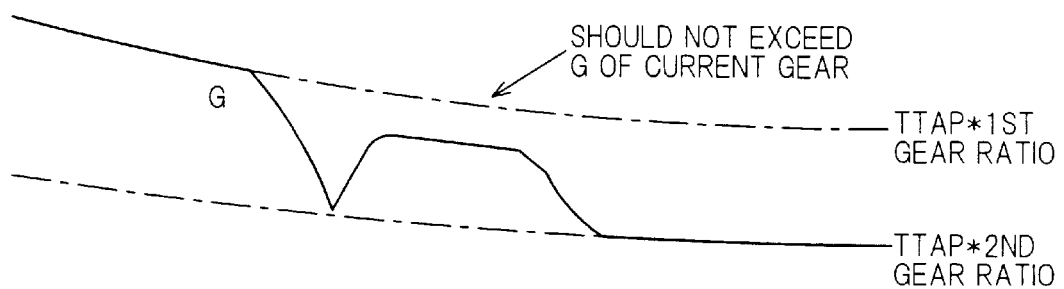
FIG. 38 is an explanatory graph showing a desired G (acceleration of gravity) acting in the longitudinal direction of the vehicle, on which the algorithm of the flow chart of FIG. 37 is based.

Moreover, although G must happen to absorb the inertia torque of the engine E when the engine speed changes, as illustrated in FIG. 38, it is not preferable that G exceeds the level generated at the current gear.

In view of the above, the system is configured to predetermine a desired G before and after the inertia-phase, more specifically, by defining the desired G by a ratio kGUIAn (n: approximately one time to three times as shown in FIG. 29C) with the use of the estimated input toque TTAP (TTAPL) and the gear ratios #RATIOn, #RATIOm before and after the shift, and determines the clutch torque (manipulated variable) based thereon.

More specifically, defining G at the current gear as 1 (upper limit) and that at the target gear as 0 (lower limit), the system uses the ratio kGUIAn (predetermined value) determined between 1 and 0, the system determines the clutch torque based on the ratio and the estimated input torque, etc., thereby decreasing the shift shock effectively so as to enhance the comfort experienced by the vehicle occupant.

Figure 39A:
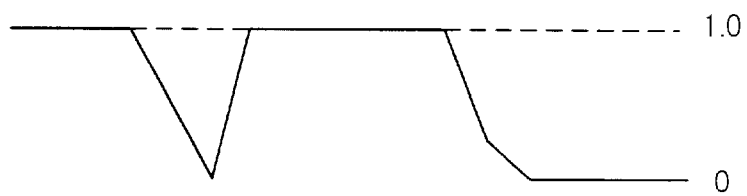
FIG. 39 is a set of explanatory graphs similarly showing the desired G (acceleration of gravity) acting in the longitudinal direction of the vehicle, on which the algorithm of the flow chart of FIG. 37 is based.
Figure 39B:
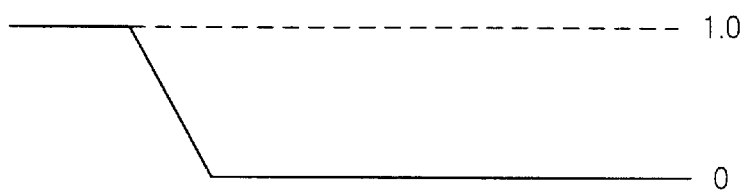
Figure 39C:
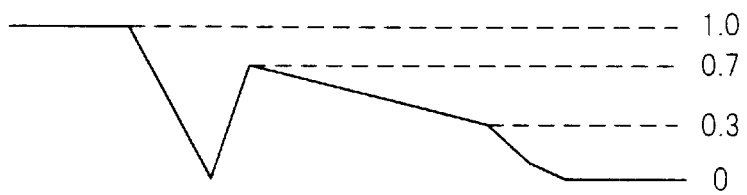

Explaining this more concretely, in upshifting, the system sets the desired G, shown as wave-form in FIG. 39. Defining the height of G at the current gear (1st in this case) as 1 and that at the target gear (2nd in this case) as 0, as illustrated in FIGS. 39A and 39B, the system determined the desired G in the range of 0.3 to 0.7 as illustrated in FIG. 39C. With this, the system can conduct the control such that the shock removal and the shift time (in other words, the clutch load) are well balanced.

Figure 40:
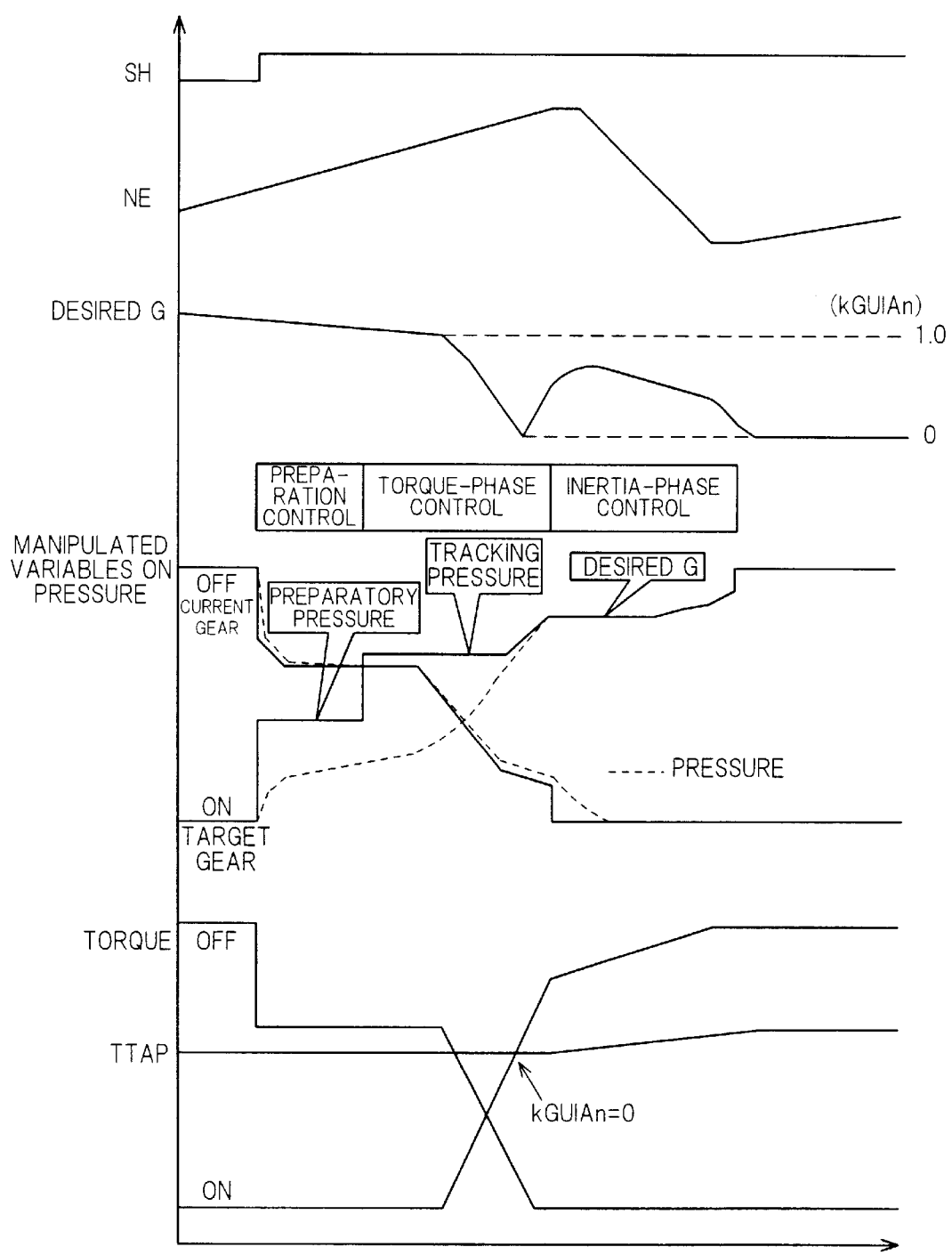
FIG. 40 is a time chart showing the processing in the flow chart of FIG. 37.

FIG. 40 is a time chart showing the control entirely. In the figure, a value corresponding to the estimated input torque TTAP indicates the height o (kGUIA1=0).

When expressing the clutch torque(s) in equation, it will be as follows:
clutch torque at the front portion of inertia-phase $$TQON1=TTAP*\{1+kGUIA1*((\#RATIOn/\#RATIOm)-1)\}$$

clutch torque at the mid portion of inertia-phase $$TQON2=TTAP*\{1+kGUIA2*((\#RATIOn/\#RATIOm)-1)\}$$

clutch torque at the rear portion of inertia-phase $$TQON3=TTAP*\{1+kGUIA3*((\#RATIOn/\#RATIOm)-1)\}$$

In the above, #RATIOn: gear reduction ratio in the current gear; #RATIOm; gear reduction ratio in the target gear.

Thus, the system is configured to determine or calculate the clutch torque based on the clutch torque(s) TQON1, TQON2 and TQON3.

In the above, the desired G can be set or predetermined in any shape of wave-form. It may be to be linear in the inertia-phase an decreases in the inertia-phase. For example, when it is thus intended to set the desired G in the form which decreases in the right direction in the figure with respect to time, for example, it suffices if the ratio kGUIA1 is set to be greater, while the ratio kGUIA2 or kGUIA3 is set be smaller. It can be set more finely if the number of ratios are increased.

The ratio kGUIAn is prepared as mapped data to be retrievable by the vehicle speed V and the throttle opening TH, separately for the shift mode such as upshifting from 1st to 2nd, upshifting from 2nd to 3rd (as explained in S808 to S810 in the flow chart of FIG. 27). It should be preferable to set the ratio in such a manner that, taking the thermal load of the clutches, the ratio increases with increasing throttle opening TH.

Based on the above, the calculation of the G1 torque, etc. will be explained with reference to the flow chart of FIG. 37.

Figure 41:
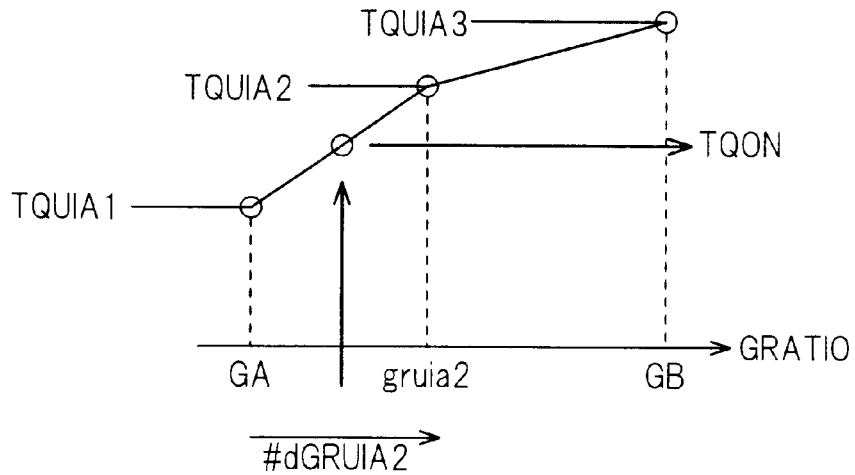
FIG. 41 is a time chart similarly, but partially showing the processing in the flow chart of FIG. 37.

The program begins in S1300 in which an inertia-phase switching slip rate gruia2 is calculated by adding a predetermined value #dGRUIA2 to a current-gear clutch slip ratio GRATIO(GA). FIG. 41 illustrates the inertia-phase switching slip ratio gruia2. The clutch slip ratio GRATIO(GA) is obtained by multiplying the clutch slip ratio GRATIO (=NM/NC) by the gear reduction ratio and is corresponding to that at the current gear (GA).

The program proceeds to S1302 in which it is determined whether the clutch slip ratio GRATIO is less than the inertia-phase switching slip ratio gruia2 and when the result is affirmative, since this indicates that it is at the front portion of the inertia-phase, the program proceeds to S1304 in which the G1 torque TQUIA1 is calculated.

As mentioned with reference to S808 to S810 in the flow chart of FIG. 27, the G1 torque TUQUIA1 is calculated by multiplying the estimated input torque TTAP by the ratio #kGUIA1 (correction coefficient; obtained based on kGUIA1 by map-retrieval by the throttle opening TH and the fixed vehicle speed VUTA).

Returning to the explanation of the flow chart of FIG. 37, the program the proceeds to S1306 in which the G2 torque TQUIA2 is calculated.

Figure 42:
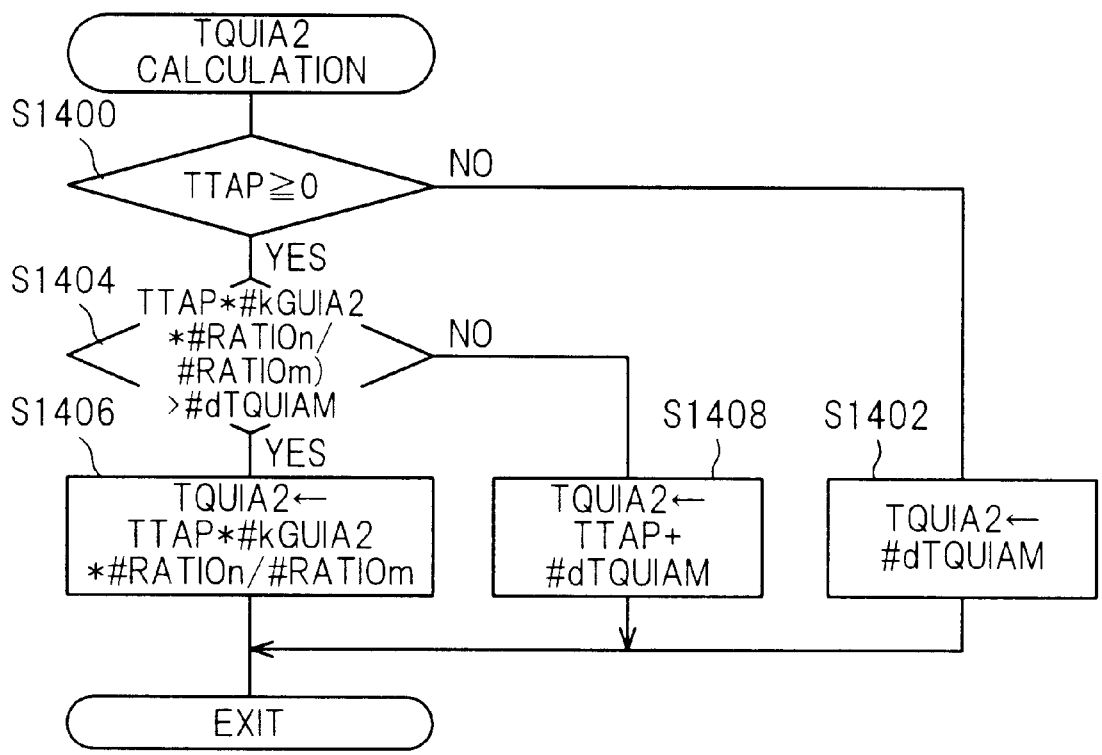
FIG. 42 is a flow chart showing the subroutine of calculating G2 torque TQUIA2 referred to in the flow chart of FIG. 37.

FIG. 42 is a flow chart showing the subroutine for the calculation.

The program begins in S1400 and proceeds up to S1408 to calculate the G2 torque TQUIA2 in the same manner as that of the G1 torque TQUIA1 explained with reference to FIG. 27, except for using a second ratio #kGUIA2 (correction coefficient; obtained based on kGUIA2 by map-retrieval by the throttle opening TH and the fixed vehicle speed VUTA) corresponding to the G2 torque TQUIA2.

Again returning to explanation of the flow chart of FIG. 37, the program proceeds to S1308 in which, by interpolating the calculated G1 torque TQUIA1 and G2 torque TQUIA2, the ON-side desired clutch torque TQON therebetween is calculated.

When the result in S1302 is negative, the program proceeds to S1310 in which the G2 torque TQUIA2 is calculated in the manner mentioned above, and to S1312 in which a G3 torque TQUIA3 is calculated.

Figure 43:
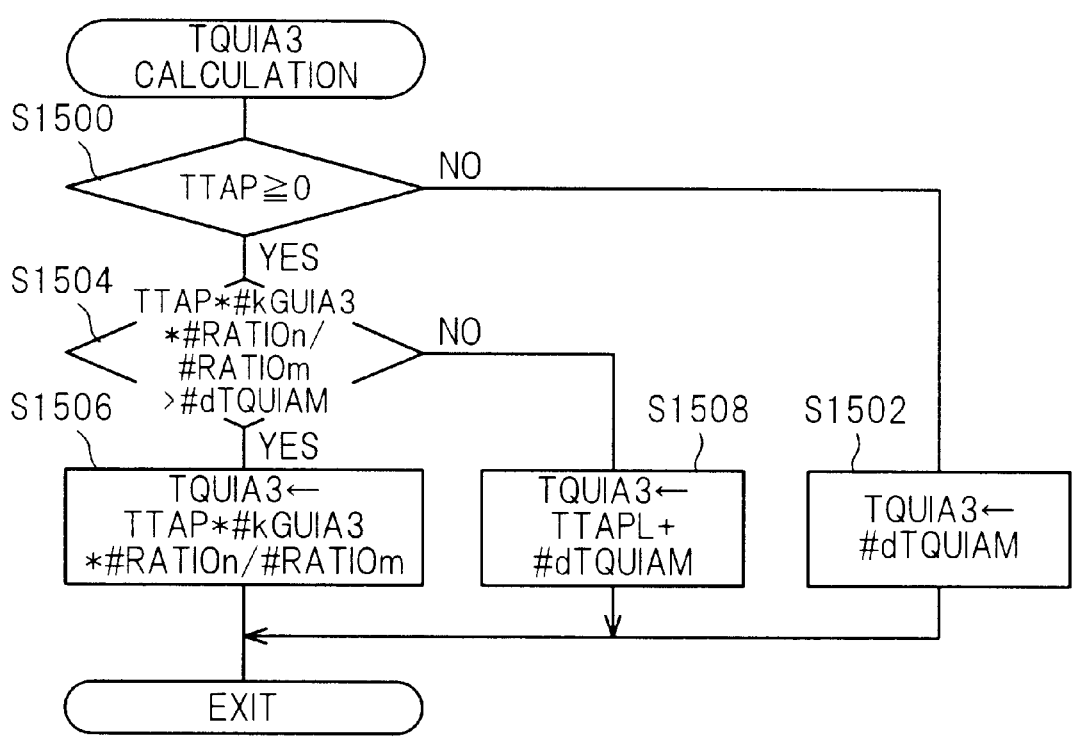
FIG. 43 is a flow chart showing the subroutine of calculating G3 torque TQUIA3 referred to in the flow chart of FIG. 37.

FIG. 43 is a flow chart showing the subroutine for the calculation.

The program begins in S1500 and proceeds up to S1508 to calculate the G3 torque TQUIA3 in the same manner as that of the G1 torque TQUIA1 explained with reference to FIG. 27, except for using a third ratio #kGUIA3 (correction coefficient; obtained based on kGUIA3 by map-retrieval by the throttle opening TH and the fixed vehicle speed VUTA) corresponding to the G3 torque TQUIA3.

Again returning to explanation of the flow chart of FIG. 37, the program proceeds to S1314 in which, by interpolating the calculated G2 torque TQUIA2 and G3 torque TQUIA3, the ON-side desired clutch torque TQON therebetween is calculated.

Having been configured in the foregoing manner, the system according to the embodiment can determine the characteristics of control as desired and can decrease the shift shock effectively. Further, since the system determines the manipulated variable using the estimated input torque as the parameter indicative of the engine toque, it can prevent from the clutch capacity from being disadvantageously balanced with the engine torque and can accordingly avoid the disadvantage in that the shifting is unnecessarily elongated such that the shifting does not finish in an expected period of time.

Again returning to the explanation of the flow chart of FIG. 3, the program proceeds to S134 in which the OFF-side desired clutch torque TQOF in the inertia-phase is set to 0, to S136 in which the ON-side clutch pressure QATON is calculated based on the calculated ON-side desired clutch toque TQON in the inertia-phase in accordance with the torque-pressure conversion explained below and generates a command value to the shift solenoid(s) SLn concerned based on the calculated ON-side clutch pressure QATON.

The program then proceeds to S138 in which the OFF-side clutch pressure QATOF is calculated based on the set OFF-side desired clutch toque TQOF in the inertia-phase in accordance with the torque-pressure conversion explained below and generates a command value to the shift solenoid (s) SLn concerned based on the calculated OFF-side clutch pressure QATOF.

In the next program, the result in S126 is normally negative, and the program proceeds to S140 in which it is determined whether the value of SFTMON is 30h or 31h and when the result is affirmative, the program proceeds to S142 in which it is determined whether the clutch slip ratio GRATIO is greater than a predetermined value #GRUEAG. The predetermined value #GRUEAG is a threshold value in clutch slip rate to determine starting of the engage control. The processing in S142 amounts for determining whether the shift is so close to the completion that the engage control should be started.

When the result in S142 is negative, the program proceeds to S132. When the result in S142 is affirmative, on the other hand, the program proceeds to S144 in which the value of SFTMON is set to 40h. The program then proceeds to S146 in which an ON-side engaging pressure as the ON-side clutch pressure QATON (i.e. the torque-pressure converted value) is calculated based on the ON-side desired clutch torque TQON.

Figure 44:
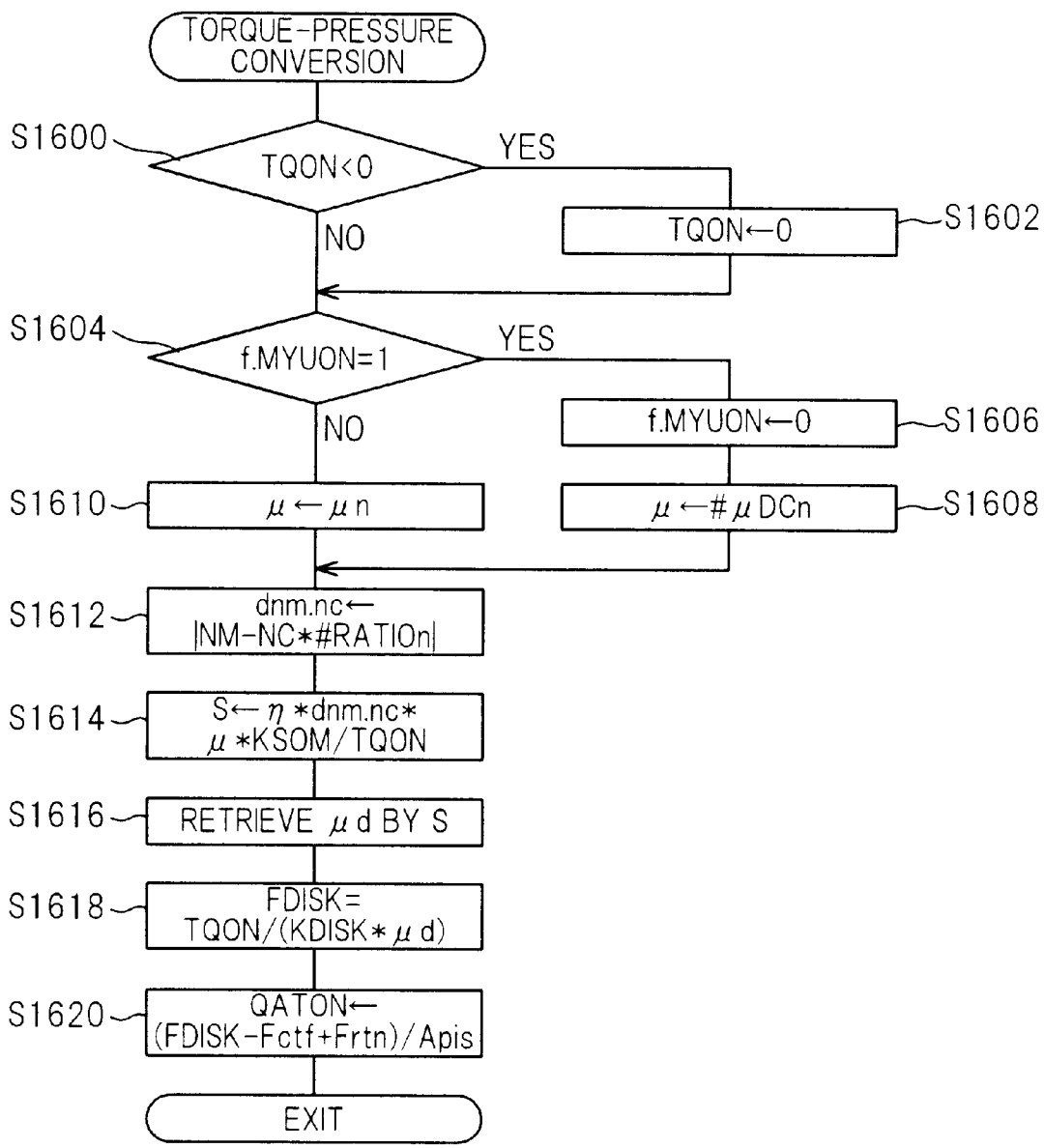
FIG. 44 is a flow chart showing the subroutine of calculating an ON-side engage pressure, more specifically, the subroutine of torque-pressure conversion referred to in the flow chart of FIG. 3.

FIG. 44 is a flow chart showing the subroutine for the calculation, more precisely the torque-pressure conversion.

Before entering the explanation thereof, however, the calculation of the torque-pressure conversion in the inertia-phase in the system according to the embodiment will be outlined.

As mentioned above, when determining the pressure to be supplied to the frictional engaging element such as the clutch, as taught by Japanese Laid-Open Patent Application No. Hei 7 (1995)-151222, in view of the fact that the friction coefficient $\mu$ of the clutch varies depending on the temperature of the pressurized oil (ATF), i.e, the viscosity of oil, the pressure to be supplied is corrected by the friction coefficient so as to determine the pressure appropriately, thereby decreasing the shift shock experienced by the vehicle occupant.

Since, however, the friction coefficient of the clutch changes not only by the oil viscosity, but also by the rotational difference of the clutch, it is preferable to calculate the clutch friction coefficient taking other parameters including the clutch rotational difference account.

In view of the above, the system according to the embodiment is configured to calculates the friction coefficient of the frictional engaging elements, i.e. te clutches additionally taking parameters including the rotational difference thereof into account to determine the pressure to be supplied thereto appropriately. More specifically, it calculates or determines the Sommerfeld number (dimensionless number) based on the viscosity of ATF and the clutch rotational difference (the difference between the input shaft rotational speed NM ad the output shaft rotatioal speed NC), etc. to estimate the clutch friction coefficient A, and to conduct the torque-pressure conversion based on the estimated clutch friction coefficient. This is the same in the torque-pressure conversion in the torque-phase.

This will be explained in detail.

Although the frictional characteristics ($\mu$ characteristic) of the clutch disk of the hydraulic clutch (Cn) vary with the rotational difference between the clutch disk and the pressure plate facing thereto, the ATF temperature TATF and the clutch disk surface pressure, the followings are generally known.

1. The clutch disk friction coefficient $\mu$ (more precisely dynamic friction coefficient $\mu d$) tends to decrease as the rotational difference (peripheral speed difference)between the clutch disk and the pressure plate decreases.

2. The clutch disk dynamic friction coefficient $\mu d$ tends to increase as the shearing force of the hydraulic oil increases, since the ATF viscosity raises when the ATF temperature drops.

3. The clutch disk dynamic friction coefficient $\mu d$ tends to decrease as the surface pressure of the clutch disk increases.

Since the clutch disk dynamic friction coefficient $\mu d$ is actually determined by the mutual influences of these three characteristics, the system is configured to predetermine a parameter S (indicative of the quantity of state, i.e. the Sommerfeld number) as the clutch disk dynamic friction coefficient through experimentation based on the rotational difference between the clutch disk and the pressure plate, the ATF temperature and the clutch disk surface pressure, and to store the same in a memory of the ROM 84 of the ECU 80.

The parameter S (i.e. Sommerfeld number) can be expressed in a equation as follows:

$$S=ATF \text{ viscosity*peripheral speed/clutch disk surface pressure}$$

In the inertia-phase in upshifting, since the ON-side clutch torque is immediately reflected to the output shaft torque, in order to decrease the shift shock, it becomes necessary to control the ON-side desired clutch torque TQON. The ON-side desired clutch torque TQON is generally expressed as follows:

$$TQON=\mu\text{*clutch disk numbers*clutch diameter*(clutch pressure*piston's pressure-receiving area+hydraulic pressure centrifugal force component-return spring force)}$$

Among of all, the clutch disk friction coefficient $\mu$, more precisely clutch disk dynamic friction coefficient $\mu d$ varies with the conditions. Accordingly, in order to suppress the shift shock, it is significant to determine the coefficient $\mu d$ accurately. In view of the above, the system is configured to calculate the clutch disk dynamic friction coefficient $\mu d$ on a real-time basis using the parameter S to determine the ON-side clutch pressure QATON, thereby ensuring to output the clutch torque as desired.

To be more specific, by controlling the actual pressure to be supplied to the clutch based on the calculated ON-side clutch pressure QATON, it becomes possible to obtain a uniform G wave-form irrespectively of the rotational difference between the clutch disk and the pressure plate, the ATF temperature and the clutch disk surface pressure, thereby ensuring to decrease or suppress the shift shock effectively.

Figure 45A:
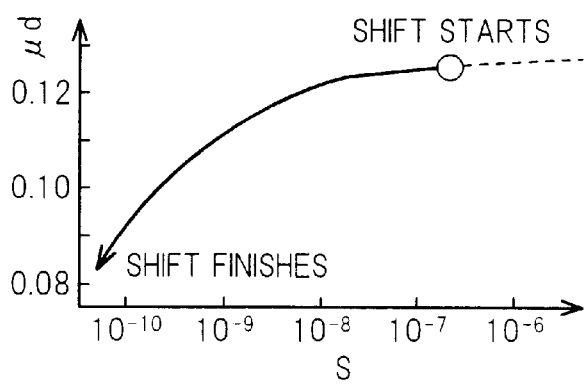
FIG. 45 is a set of graphs showing the torque-pressure conversion referred to in the flow chart of FIG. 44.
Figure 45B:
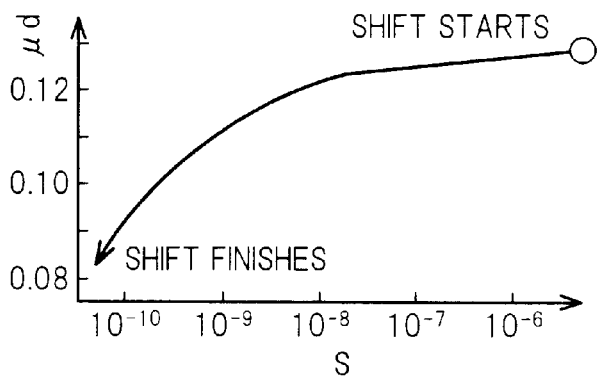
Figure 45C:
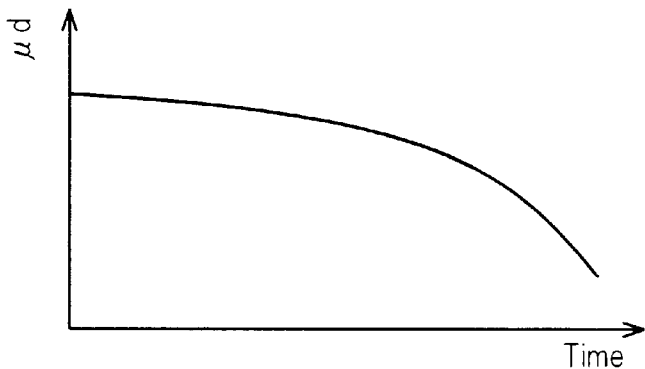
Figure 45D:
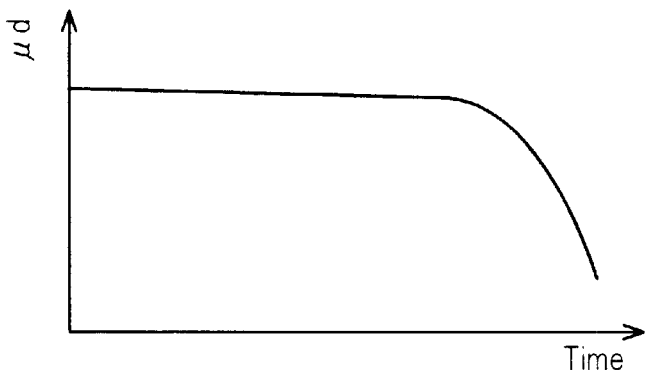

Explaining this with reference to FIGS. 45A to 45D, the system control to start the shifting from a point where S is relatively small if the ATF temperature is relatively high, as illustrated in FIG. 45A, and to start the shifting from a point where S is relatively great if the ATF temperature is relatively low, as illustrated in FIG. 45B. FIG. 45C illustrates the change of the friction coefficient with respect to time at high ATF temperature and FIG. 45D illustrates that at low ATF temperature. Thus, by controlling the clutch hydraulic pressure by taking the change of the friction coefficient into account, it becomes possible to obtain a more uniform wave-form of G.

Figure 46:
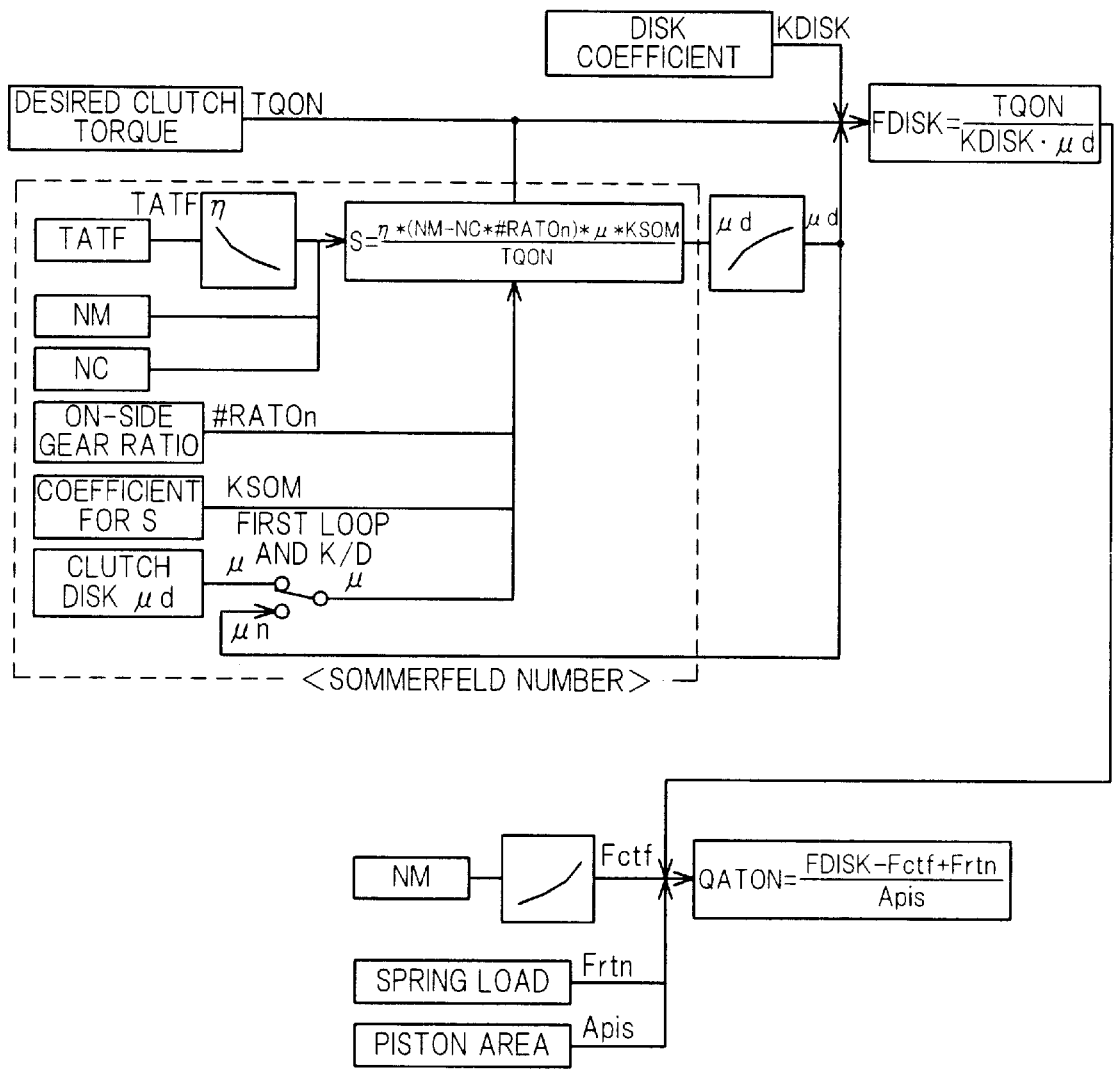
FIG. 46 is a block diagram similarly showing the torque-pressure conversion referred to in the flow chart of FIG. 44.

Based on the above, the torque-pressure conversion will be explained with respect to the ON-side clutch torque referring to the flow chart of FIG. 44. FIG. 46 is a block diagram similarly showing the conversion.

The program begins in S1600 in which it is determined whether the calculated desired clutch torque TQON is less than 0, in other words, it is determined whether the value is a negative value. When the result is affirmative, the program proceeds to S1602 in which the desired clutch torque TQON is determined to be 0.

The program then proceeds to S1604 in which it is determined whether the bit of a flag f.MYUON is set to 1. Since the bit of the flag is set to 1 in a routine (not shown) when the shift control is started, the determination in S1604 amounts for determining whether it is for the first program loop in the shift control.

When the result in S1604 is affirmative, the program proceeds to S1606 in which the bit of the flag is reset to 0, to S1608 in which the clutch disk friction coefficient $\mu$ is set to its initial value #$\mu$Dcn, since the calculation of the parameter S requires the value of $\mu$. When the result in S1604 is negative, the program proceeds to S1610 in which the preceding value of $\mu$n (the value at the program loop n time(s) earlier) is renamed as $\mu$ (i.e. current value).

The program then proceeds to S1612 in which the rotational difference dnm.nc based on the input shaft rotational speed NM, the output shaft rotational speed NC and the gear reduction ratio #RATIOn, and to S1614 in which the parameter S (Sommerfeld number) is calculated, as shown The parameter is calculated by multiplying the rotational difference dnm.nc by the ATF viscosity $\eta$, the friction coefficient $\mu$ and a Sommerfeld number calculation coefficient KZOM to obtain a product and by dividing the obtained product by the desired clutch torque TQON. As mentioned above, the initial value or the preceding value is used as $\mu$.

More specifically, the parameter S is calculated as follows:

$$S=(\eta*dnm.nc)/Pdisk$$

In the above, the ATF viscosity $\eta$ is prepared as table data to be retrieved by the detected ATF temperature. Pdisk indicates the clutch disk surface pressure and is calculated as follows:

$$Pdisk=TQON/(KZOM*\mu)$$

The program proceeds to S1616 in which the clutch disk dynamic friction coefficient $\mu$d is retrieved from table data using the parameter S as address datum, and to S1618 in which a value FDISK (indicative of the disk pressing force by hydraulic pressure) is calculated by dividing the ON-side desired clutch torque TQON by a product obtain by multiplying a coefficient KDISK by the friction coefficient $\mu$d. The coefficient KDISK is a value prepared differently or separately for the clutches to be used for calculating the value FDISK from the ON-side desired clutch torque TQON.

The program proceeds to S1620 in which a value Fctf (indicative of the hydraulic pressure centrifugal force component acting on the clutch drum) is subtracted from the value FDISK, but a value Frtn (indicative of the aforesaid the return spring force) is added, and by dividing the obtained value is divided by a value Apis (indicative of the aforesaid piston's pressure-receiving area) to determine the quotient as the ON-side clutch pressure QATON. The value Fctf is obtained by retrieving table data by the input shaft rotational speed NM.

Again returning to the flow chart of FIG. 3, the program proceeds to S148 in which the OFF-side engage pressure is calculated or determined as the OFF-side clutch pressure QATOF in the manner similar to the above.

Figure 47:
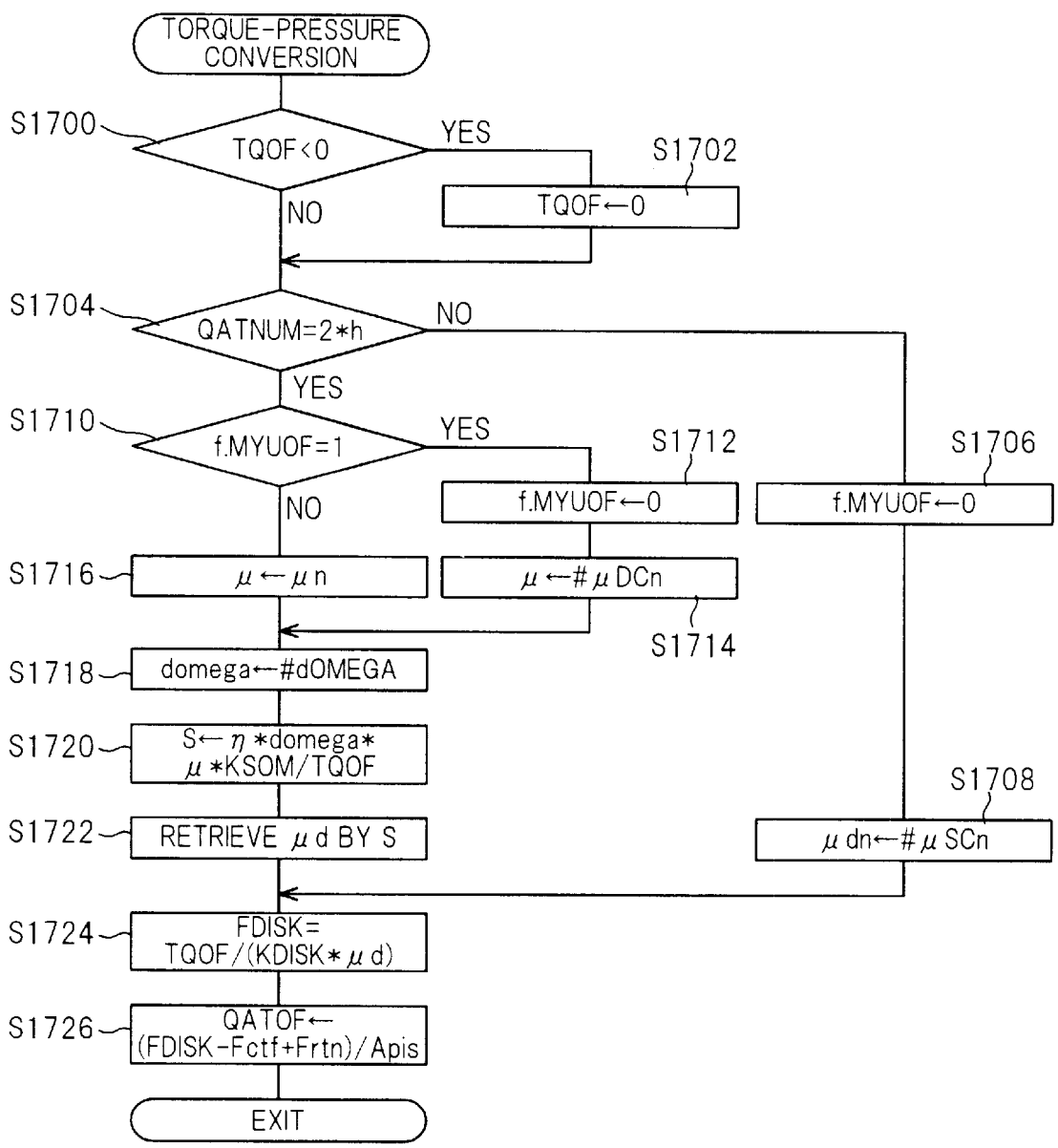
FIG. 47 is a flow chart showing the subroutine of calculating an ON-side clutch pressure, more specifically, the subroutine of torque-pressure conversion referred to in the flow chart of FIG. 3.

FIG. 47 is a flow chart showing the subroutine for the calculation.

The program begins in S1700 in which it is determined whether the calculated OFF-side desired clutch toque TQOF is less than 0, in other words, it is determined whether TQOF is a negative value and when the result is affirmative, the program proceeds to S1702 in which the OFF-side desired clutch torque TQOF is determined to be 0.

The program then proceeds to S1704 in which it is determined whether the value of the shift mode QATNUM is 2*h, in other words, it is determined whether the shift is the downshift and when the result is negative, the program proceeds to S1706 in which the bit of a flag f.MYUOF (similar to f.MYON) is reset to 0, and to S1708 in which the friction coefficient $\mu$d is set to be a predetermined value #$\mu$SCn (corresponding to static friction coefficient), since the main purpose of the OFF-side pressure control in upshifting is prevent the clutch from slipping.

When the result in S1704 is affirmative, since this indicates that the shift is the downshift, the program proceeds to S1710 in which it is determined whether the bit of the flag f.MYUOF is set to 1 and when the result is affirmative, the program proceeds to S1712 in which the bit of the flag is reset to 0, and to S1714 in which the friction coefficient ntis set to be an initial value #$\mu$Dcn. When the result in S1710 is negative, the program proceeds to S1716 in which the preceding value of $\mu$n (the value at the program loop n time(s) earlier) is renamed as $\mu$ (i.e. current value).

The program then proceeds to S1718 in which a clutch rotational difference domega is set to be a constant value #dOMEGA. The program then proceeds to 1720 in which the parameter S (Sommerfeld number) is calculated similar to the calculation of the ON-side value, to S1722 in which the dynamic friction coefficient $\mu$d is retrieved from table data using the parameter S as address datum, to S1724 in which the value FDISK is calculated, and to S1726 in which the clutch pressure QATOF is calculated as shown there.

Again returning to the flow chart of FIG. 3, when the result in S140 is negative, the program proceeds to S150 in which it is determined whether the value of the timer tUEAG has reached 0 and when the result is negative, the program proceeds to S146. On the other hand, when the result is affirmative, the program proceeds to S152 in which the parameters are reset to zero and other processing necessary for finishing is conducted.

As mentioned above, the embodiment of the invention is configured to have a system for controlling an automatic transmission (T) of a vehicle (1) having an input shaft (MS) connected to an internal combustion engine (E) mounted on the vehicle and an output shaft (CS) connected to driven wheels (W) of the vehicle, the transmission transmitting input torque, through any of frictional engaging elements (Cn), generated by the engine and inputted by the input shaft to the driven wheels by the output shaft, in accordance with predetermined shift scheduling (S10) defining a target gear (SH, GB) based on detected operating conditions of the vehicle and the engine, including; hydraulic pressure calculating means (80, S20, S120, S714, S1010, S730, S740) for calculating hydraulic pressure (QATON) to be supplied to the frictional engaging elements (Cn); and hydraulic pressure control circuit (O) for supplying hydraulic pressure to the frictional engaging elements based on at least the calculated hydraulic pressure (QATON). The characteristic features of the system are that the system includes: input shaft rotational speed detecting means (64, 80) for detecting input shaft rotational speed (NM) inputted to the transmission; input torque calculating means (80, S20, S120, S1100–S1142, S1200–S1222) for calculating the input torque (TTAP) inputted to the transmission; reached-pressure determining means (80, S20, S120, S714, S900–S912, S1002) for determining a reached-pressure (qutal, A) based on at least the calculated input torque; maximum control response value determining means (80, S20, S120, S714, S1006) for determining a maximum value (kDB2A, KX (=X/Y)) in pressure control response set with respect to a desired reaching time (TMUTAG, Y) in accordance with a predetermined characteristic, based on at least the detected input shaft rotational speed and the determined reached-pressure; actual control response value determining means (80, S20, S120, S714, S1008) for determining an actual value (kDB2B, K (=A/B)) in the pressure control response based on at least the determined reached-pressure relative to the desired reaching time; and desired value determining means (80, S20, S120, S714, S1010, S730, S740) for comparing the determined maximum value and the determined actual value to determine the pressure control response and for determining a desired value (TQON) to be supplied to one of the frictional engaging elements (Cn) of the target gear to be shift to, based on the determined pressure control response; and the hydraulic pressure calculating means (80, S20, S120, S714, S1000, S730, S740) calculates the hydraulic pressure (QATON) based on the desired value (TQON).

With this, it becomes possible to enhance the control characteristics, thereby decreasing the shift shock effectively so as to improve the feeling of the vehicle occupant, while ensuring to prevent the engine from revving over or excessively. Further, the system does not detect whether the engine revs over, when compared with a case in which the feedback control is conducted to cope with the revving over of the engine, it becomes possible to shorten the control time in the torque-phase. And no attention is needed to the revving over of the engine in the control, it winl be possible to conduct the control at higher pressure such that the control response is enhanced, thereby further shorting the control time in the torque-phase and further improving the control characteristics.

In the system, the desired value determining means determines the desired value based on the determined maximum value when the determined actual value is greater than the determined maximum value (80, S20, S120, S714, S1010, S1012, S740). With this, it becomes possible to enhance the control toughness against the engine speed change, thereby decreasing the shift shock effectively so as to improve the feeling of the vehicle occupant.

In the system, the desired value determining means determines the desired value based on the determined actual value when the determined actual value is less than the determined maximum value (80, S20, S714, S1010, S1014, S730). With this, it becomes possible to determine the pressure supply with better attention to the tracking or follow-up performance of hydraulic pressure such that the pressure reaches the desired value within the desired time, thereby decreasing the shift shock effectively so as to improve the feeling of the vehicle occupant.

In the system, the desired value determining means determines a second desired value to be supplied to a second one of the frictional engaging elements of a gear now being engaged, based on the desired value to be supplied to the one of the frictional engaging elements of the target gear (80, S20, S120, S722, S732, S742). With this, it becomes possible to determine the pressure supply with better attention to the tracking or follow-up performance of hydraulic pressure such that the pressure reaches the desired value within the desired time, thereby decreasing the shift shock effectively so as to improve the feeling of the vehicle occupant.

In the system, the desired value determining means determines the second desired value based on a difference obtained by subtracting the determined input torque from the desired value to be supplied to the one of the frictional engaging elements of the target gear (80, S20, S120, S722, S732, S742). With this, in addition to the advantages mentioned above, it becomes possible to determine the pressure supply to the gears with a good balance.

The system further includes temperature detecting means for detecting a temperature of oil (TAFT) generating the hydraulic pressure (70, 80); and the maximum control response value determining means determines the maximum value based on the detected input shaft rotational speed, the determined reached-pressure and the detected temperature of the oil (80, S20, S120, S714, S1006). With this, in addition to the advantages mentioned above, it becomes possible to determine the pressure supply to the gears with a good balance. With this, it becomes possible to determine the pressure supply with better attention to the tracking or follow-up performance of hydraulic pressure and enhance the control toughness against the engine speed change, thereby decreasing the shift shock effectively so as to improve the feeling of the vehicle occupant.

In the system, the desired value determining means determines the desired value (TQON) by a time including a torque-phase of shift (80, S20, S704). With this, in addition to the advantages mentioned above, it becomes possible to enter the control in the inertia-phase.

In the system, the hydraulic pressure calculating means includes; output shaft rotational speed detecting means (66, 80) for detecting an output shaft rotational speed (NC) to be outputted from the transmission; temperature detecting means (70, 80) for detecting a temperature (TATF) of oil (ATF) generating the hydraulic pressure; viscosity parameter calculating means (80, S20, S146, S1608, S1610) for calculating a viscosity parameter ($\eta$) indicative of viscosity of the oil based on the detected temperature of the oil in accordance with a predetermined characteristic; clutch parameter calculating means (80, S20, S146, S1614) for calculating a clutch parameter (S) indicative of condition of the one of the frictional engaging elements based on at least the calculated viscosity parameter, the detected input shaft rotational speed and the detected output shaft rotational speed; friction coefficient calculating means (80, S20, S146, S1616) for calculating a friction coefficient ($\mu, \mu d$) of the one of the frictional engaging elements based on the calculated clutch parameter in accordance with a predetermined second characteristic; and conversion means (80, S20, S140, S148, S1620) for converting the desired value (TQON) into the hydraulic pressure value (QATON) using at least the calculated frictional coefficient.

With this, it becomes possible to determine the pressure to be supplied to the frictional engaging element appropriately, thereby decreasing the shift shock effectively so as to improve the feeling of the vehicle occupant.

In the system, the conversion means includes; first force calculating means (80, S20, S146, S1618) for calculating a pressing force (FDISK) of the frictional engaging element based on a quotient obtained by dividing the desired value (TQON) by a product of a predetermined coefficient (KDISK) and the friction coefficient; and second force calculating means (80, S20, S146, S1620) for subtracting a hydraulic pressure centrifugal force component (Fctf) acting on the frictional engaging element from the pressing force (FDISK) to calculate a difference therebetween and for adding a return spring force (Frtn) to the difference to calculate a sum thereof; and calculates the hydraulic pressure (QATON) from a quotient obtained by dividing the sum by a pressure-receiving surface (Apis) of the frictional engaging element.

In the system, the second force calculating means (80, S20, S146, S1620) calculates the hydraulic pressure centrifugal force component based on the input shaft rotational speed (NM).

In the system, the clutch parameter calculating means (80, S20, S146, S1614) calculates the clutch parameter in such a manner that the clutch parameter increases with increasing temperature of the oil.

Further, the embodiment is configured to have a system for controlling an automatic transmission (T) of a vehicle (1)

having an input shaft (MS) connected to an internal combustion engine (E) mounted on the vehicle and an output shaft (CS) connected to driven wheels (W) of the vehicle, the transmission transmitting input torque, through any of frictional engaging elements (Cn), generated by the engine and inputted by the input shaft to the driven wheels by the output shaft, in accordance with predetermined shift scheduling (S10) defining a target gear (SH, GB) based on detected operating conditions of the vehicle and the engine, including; hydraulic pressure calculating means (80, S20, S146, S148, S1620, S1726) for calculating hydraulic pressure (QATON, QATOF) to be supplied to the frictional engaging elements (Cn); and hydraulic pressure control circuit (O) for supplying hydraulic pressure to the frictional engaging elements based on at least the calculated hydraulic pressure (QATON).. The characteristic features are that the system includes: input shaft rotational speed detecting means (64, 80) for detecting input shaft rotational speed (NM) inputted to the transmission; output shaft rotational speed detecting means (66, 80) for detecting an output shaft rotational speed (NC) to be outputted from the transmission; temperature detecting means (70, 80) for detecting a temperature (TATF) of oil (ATF) generating the hydraulic pressure; viscosity parameter calculating means (80, S20, S146, S1614) for calculating a viscosity parameter ($\eta$) indicative of viscosity of the oil based on the detected temperature of the oil in accordance with a predetermined characteristic; desired torque calculating means (80, S20, S132, S1308, S1314) for calculating a desired torque (TQON) necessary for effecting shift to be supplied to one of the frictional engaging elements of the target gear; surface pressure calculating means (80, S20, S146, S1618) for calculating a surface pressure (Pdisk) acting on the one of the frictional engaging elements based on at least the desired torque; clutch parameter calculating means (80, S20, S146, S1614) for calculating a clutch parameter (S) indicative of condition of the frictional engaging elements based on at least the calculated viscosity parameter, the surface pressure, the detected input shaft rotational speed and the detected output shaft rotational speed; friction coefficient calculating means (80, S20, S146, S1616) for calculating a friction coefficient ($\mu$, $\mu$d) of the frictional engaging elements based on the calculated clutch parameter in accordance with a predetermined second characteristic; conversion means (80, S20, S146, S1620) for converting the desired torque (TQON) into the hydraulic pressure value (QATON) using at least the calculated frictional coefficient. and the hydraulic pressure calculating means (80, S20, S136) calculates the hydraulic pressure (QATON) based on the desired torque.

In the system, the surface pressure (PDISK) calculating means calculates the surface pressure based on the desired torque (TQON) and the friction coefficient. More specifically, the surface pressure calculating means calculates the surface pressure (PDISK) based on the desired torque (TQON) and at least one of a fixed value of the friction coefficient and a preceding value of the friction coefficient.

It should be noted in the above, although the engine torque is estimated or calculated, it is alternative possible to use a torque sensor to determine the engine torque.

While the invention has thus been shown and described with reference to specific embodiments, it should be noted that the invention is in no way limited to the details of the described arrangements but changes and modifications may be made without departing from the scope of the appended claims.

What is claimed is:

1. A system for controlling an automatic transmission of a vehicle having an input shaft connected to an internal combustion engine mounted on the vehicle and an output shaft connected to driven wheels of the vehicle, the transmission transmitting input torque, through any of frictional engaging elements, generated by the engine and inputted by the input shaft to the driven wheels by the output shaft, in accordance with predetermined shift scheduling defining a target gear based on detected operating conditions of the vehicle and the engine, comprising;
   input shaft rotational speed detecting means for detecting input shaft rotational speed inputted to the transmission;
   input torque calculating means for calculating the input torque inputted to the transmission;
   reached-pressure determining means for determining a reached-pressure based on at least the calculated input torque;
   maximum control response value determining means for determining a maximum value in pressure control response set with respect to a desired reaching time in accordance with a predetermined characteristic, based on at least the detected input shaft rotational speed and the determined reached-pressure;
   actual control response value determining means for determining an actual value in the pressure control response based on at least the determined reached-pressure relative to the desired reaching time;
   desired value determining means for comparing the determined maximum value and the determined actual value to determine the pressure control response and for determining a desired value to be supplied to one of the frictional engaging elements of the target gear to be shift to, based on the determined pressure control response;
   hydraulic pressure calculating means for calculating hydraulic pressure to be supplied to the one of the frictional engaging elements based on the desired value; and
   hydraulic pressure control circuit for supplying hydraulic pressure to the frictional engaging elements based on at least the calculated hydraulic pressure.

2. A system according to claim 1, wherein the desired value determining means determines the desired value based on the determined maximum value when the determined actual value is greater than the determined maximum value.

3. A system according to claim 1, wherein the desired value determining means determines the desired value based on the determined actual value when the determined actual value is less than the determined maximum value.

4. A system according to any of claims 1, wherein the desired value determining means determines a second desired value to be supplied to a second one of the frictional engaging elements of a gear now being engaged, based on the desired value to be supplied to the one of the frictional engaging elements of the target gear.

5. A system according to claim 4, wherein the desired value determining means determines the second desired value based on a difference obtained by subtracting the determined input torque from the desired value to be supplied to the one of the frictional engaging elements of the target gear.

6. A system according to claim 1, further including:
   temperature detecting means for detecting a temperature of oil generating the hydraulic pressure;
   and the maximum control response value determining means determines the maximum value based on the detected input shaft rotational speed, the determined reached-pressure and the detected temperature of the oil.

7. A system according to claim 1, wherein the desired value determining means determines the desired value by a time including a torque-phase of shift.

8. A system according to claim 1, wherein the hydraulic pressure calculating means includes:
  output shaft rotational speed detecting means for detecting an output shaft rotational speed to be outputted from the transmission;
  temperature detecting means for detecting a temperature of oil generating the hydraulic pressure;
  viscosity parameter calculating means for calculating a viscosity parameter indicative of viscosity of the oil based on the detected temperature of the oil in accordance with a predetermined characteristic;
  clutch parameter calculating means for calculating a clutch parameter indicative of condition of the one of the frictional engaging elements based on at least the calculated viscosity parameter, the detected input shaft rotational speed and the detected output shaft rotational speed;
  friction coefficient calculating means for calculating a friction coefficient of the one of the frictional engaging elements based on the calculated clutch parameter in accordance with a predetermined second characteristic; and
  conversion means for converting the desired value into the hydraulic pressure value using at least the calculated frictional coefficient.

9. A system according to claim 8, wherein the conversion means includes;
  first force calculating means for calculating a pressing force of the frictional engaging element based on a quotient obtained by dividing the desired value by a product of a predetermined coefficient and the friction coefficient; and
  second force calculating means for subtracting a hydraulic pressure centrifugal force component acting on the frictional engaging element from the pressing force to calculate a difference therebetween and for adding a return spring force to the difference to calculate a sum thereof;
  and calculates the hydraulic pressure from a quotient obtained by dividing the sum by a pressure-receiving surface of the frictional engaging element.

10. A system according to claim 9, wherein the second force calculating means calculates the hydraulic pressure centrifugal force component based on the input shaft rotational speed.

11. A system according to claim 8, wherein the clutch parameter calculating means calculates the clutch parameter in such a manner that the clutch parameter increases with increasing temperature of the oil.

12. A system for controlling an automatic transmission of a vehicle having an input shaft connected to an internal combustion engine mounted on the vehicle and an output shaft connected to driven wheels of the vehicle, the transmission transmitting input torque, through any of frictional engaging elements, generated by the engine and inputted by the input shaft to the driven wheels by the output shaft, in accordance with predetermined shift scheduling defining a target gear based on detected operating conditions of the vehicle and the engine, comprising;
  input shaft rotational speed detecting means for detecting input shaft rotational speed inputted to the transmission;
  output shaft rotational speed detecting means for detecting an output shaft rotational speed to be outputted from the transmission;
  temperature detecting means for detecting a temperature of oil generating the hydraulic pressure;
  viscosity parameter calculating means for calculating a viscosity parameter indicative of viscosity of the oil based on the detected temperature of the oil in accordance with a predetermined characteristic;
  desired torque calculating means for calculating a desired torque necessary for effecting shift to be supplied to one of the frictional engaging elements of the target gear;
  surface pressure calculating means for calculating a surface pressure acting on the one of the frictional engaging elements based on at least the desired torque;
  clutch parameter calculating means for calculating a clutch parameter indicative of condition of the frictional engaging elements based on at least the calculated viscosity parameter, the surface pressure, the detected input shaft rotational speed and the detected output shaft rotational speed;
  friction coefficient calculating means for calculating a friction coefficient of the frictional engaging elements based on the calculated clutch parameter in accordance with a predetermined second characteristic;
  conversion means for converting the desired torque into the hydraulic pressure value using at least the calculated frictional coefficient and;
  hydraulic pressure control circuit for supplying the calculated hydraulic pressure to the one of the frictional engaging elements based on at least the calculated hydraulic pressure.

13. A system according to claim 12, wherein the surface pressure calculating means calculates the surface pressure based on the desired torque and the friction coefficient.

14. A system according to claim 12, wherein the surface pressure calculating means calculates the surface pressure based on the desired torque and at least one of a fixed value of the friction coefficient and a preceding value of the friction coefficient.

15. A method of controlling an automatic transmission of a vehicle having an input shaft connected to an internal combustion engine mounted on the vehicle and an output shaft connected to driven wheels of the vehicle, the transmission transmitting input torque, through any of frictional engaging elements, generated by the engine and inputted by the input shaft to the driven wheels by the output shaft, in accordance with predetermined shift scheduling defining a target gear based on detected operating conditions of the vehicle and the engine, comprising the steps of;
  (a) detecting input shaft rotational speed inputted to the transmission;
  (b) calculating the input torque inputted to the transmission;
  (c) determining a reached-pressure based on at least the calculated input torque;
  (d) determining a maximum value in pressure control response set with respect to a desired reaching time in accordance with a predetermined characteristic, based on at least the detected input shaft rotational speed and the determined reached-pressure;
  (e) determining an actual value in the pressure control response based on at least the determined reached-pressure relative to the desired reaching time;
  (f) comparing the determined maximum value and the determined actual value to determine the pressure control response and for determining a desired value to be supplied to one of the frictional engaging elements of the target gear to be shift to, based on the determined pressure control response;

(g) calculating hydraulic pressure to be supplied to the one of the frictional engaging elements based on the desired value; and (h) supplying hydraulic pressure to the frictional engaging elements based on at least the calculated hydraulic pressure.

16. A method according to claim 15, wherein the step (f) determines the desired value based on the determined maximum value when the determined actual value is greater than the determined maximum value.

17. A method according to claim 15, wherein the step (f) determines the desired value based on the determined actual value when the determined actual value is less than the determined maximum value.

18. A method according to claim 15, wherein the step (f) determines a second desired value to be supplied to a second one of the frictional engaging elements of a gear now being engaged, based on the desired value to be supplied to the one of the frictional engaging elements of the target gear.

19. A method according to claim 18, wherein the step (f) determines the second desired value based on a difference obtained by subtracting the determined input torque from the desired value to be supplied to the one of the frictional engaging elements of the target gear.

20. A method according to claim 15, further including the step of:

(i) detecting a temperature of oil generating the hydraulic pressure;

and the step (d) determines the maximum value based on the detected input shaft rotational speed, the determined reached-pressure and the detected temperature of the oil.

21. A method according to claim 15, wherein the step (f) determines the desired value by a time including a torque-phase of shift.

22. A method according to claim 15, wherein the step (g) includes the steps of:

(j) detecting an output shaft rotational speed to be outputted from the transmission;

(k) detecting a temperature of oil generating the hydraulic pressure;

(l) calculating a viscosity parameter indicative of viscosity of the oil based on the detected temperature of the oil in accordance with a predetermined characteristic;

(m) calculating a clutch parameter indicative of condition of the one of the frictional engaging elements based on at least the calculated viscosity parameter, the detected input shaft rotational speed and the detected output shaft rotational speed;

(n) calculating a friction coefficient of the one of the frictional engaging elements based on the calculated clutch parameter in accordance with a predetermined second characteristic; and (o) converting the desired value into the hydraulic pressure value using at least the calculated frictional coefficient.

23. A method according to claim 22, wherein the step (o) includes the steps of;

(p) calculating a pressing force of the frictional engaging element based on a quotient obtained by dividing the desired value by a product of a predetermined coefficient and the friction coefficient; and (q) subtracting a hydraulic pressure centrifugal force component acting on the frictional engaging element from the pressing force to calculate a difference therebetween and for adding a return spring force to the difference to calculate a sum thereof;

and calculates the hydraulic pressure from a quotient obtained by dividing the sum by a pressure-receiving surface of the frictional engaging element.

24. A method according to claim 23, wherein the step (q) calculates the hydraulic pressure centrifugal force component based on the input shaft rotational speed.

25. A method according to claim 22, wherein the step (m) calculates the clutch parameter in such a manner that the clutch parameter increases with increasing temperature of the oil.

26. A method of controlling an automatic transmission of a vehicle having an input shaft connected to an internal combustion engine mounted on the vehicle and an output shaft connected to driven wheels of the vehicle, the transmission transmitting input torque, through any of frictional engaging elements, generated by the engine and inputted by the input shaft to the driven wheels by the output shaft, in accordance with predetermined shift scheduling defining a target gear based on detected operating conditions of the vehicle and the engine, comprising the steps of;

(a) detecting input shaft rotational speed inputted to the transmission;

(b) detecting an output shaft rotational speed to be outputted from the transmission;

(c) detecting a temperature of oil generating the hydraulic pressure;

(d) calculating a viscosity parameter indicative of viscosity of the oil based on the detected temperature of the oil in accordance with a predetermined characteristic;

(e) calculating a desired torque necessary for effecting shift to be supplied to one of the frictional engaging elements of the target gear;

(f) calculating a surface pressure acting on the one of the frictional engaging elements based on at least the desired torque;

(g) calculating a clutch parameter indicative of condition of the frictional engaging elements based on at least the calculated viscosity parameter, the surface pressure, the detected input shaft rotational speed and the detected output shaft rotational speed;

(h) calculating a friction coefficient of the frictional engaging elements based on the calculated clutch parameter in accordance with a predetermined second characteristic;

(i) converting the desired torque into the hydraulic pressure value using at least the calculated frictional coefficient and;

(j) supplying the calculated hydraulic pressure to the one of the frictional engaging elements based on at least the calculated hydraulic pressure.

27. A method according to claim 26, wherein the step (f) calculates the surface pressure based on the desired torque and the friction coefficient.

28. A method according to claim 26, wherein the step (f calculates the surface pressure based on the desired torque and at least one of a fixed value of the friction coefficient and a preceding value of the friction coefficient.

* * * * *